US011886680B1

(12) United States Patent
Paramasamy et al.

(10) Patent No.: US 11,886,680 B1
(45) Date of Patent: *Jan. 30, 2024

(54) USER INTERFACES FOR CONTEXTUAL MODELING FOR ELECTRONIC LOAN APPLICATIONS

(71) Applicant: Wells Fargo Bank, N.A., San Francisco, CA (US)

(72) Inventors: Sivamurugan Paramasamy, Waukee, IA (US); Nathan Longfellow, Flower Mound, TX (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/067,156

(22) Filed: Dec. 16, 2022

Related U.S. Application Data

(63) Continuation of application No. 17/204,583, filed on Mar. 17, 2021, now Pat. No. 11,561,666.

(51) Int. Cl.
 *G06F 3/0481* (2022.01)
 *G06Q 40/03* (2023.01)

(52) U.S. Cl.
 CPC .......... *G06F 3/0481* (2013.01); *G06Q 40/03* (2023.01)

(58) Field of Classification Search
 CPC .............................. G06F 3/0481; G06Q 40/03
 See application file for complete search history.

(56) References Cited

U.S. PATENT DOCUMENTS

| | | | |
|---|---|---|---|
| 5,611,052 A | 3/1997 | Dykstra et al. | |
| 6,985,886 B1 | 1/2006 | Broadbent et al. | |
| 7,181,427 B1 | 2/2007 | Defrancesco et al. | |
| 7,555,459 B2 | 6/2009 | Dhar et al. | |
| 7,640,209 B1 | 12/2009 | Brooks et al. | |
| 7,822,680 B1 * | 10/2010 | Weber ................... | G06Q 40/04 705/37 |
| 8,041,635 B1 | 10/2011 | Garcia et al. | |
| 8,099,356 B2 | 1/2012 | Feinstein et al. | |

(Continued)

FOREIGN PATENT DOCUMENTS

| | | |
|---|---|---|
| WO | 2017/205902 A1 | 12/2017 |
| WO | 2019/021312 A1 | 1/2019 |
| WO | 2019/074446 A1 | 4/2019 |

OTHER PUBLICATIONS

Berg, Tobias et al. "On the Rise of Fintechs: Credit Scoring Using Digital Footprints," The Review of Financial Studies, vol. 33, No. 7, pp. 2845-2897 (2020).

*Primary Examiner* — Mong-Shune Chung
(74) *Attorney, Agent, or Firm* — Merchant & Gould P.C.

(57) ABSTRACT

A system for managing an electronic loan application can include: a loan information pane listing financial information associated with a loan transaction, the financial information including details of the loan transaction and an indicator of a status of an attribute of the loan transaction; an action pane listing upcoming actions associated with the loan transaction; and an assets pane listing assets associated with the loan transaction, the assets pane including: a list with each of the assets, including identification of each of the assets; and a statement pane for a selected asset of the assets, the statement pane listing items associated with a statement for the selected asset, with each of the items including a status indicator and a highlighted excerpt from the statement.

20 Claims, 12 Drawing Sheets

(56) References Cited

U.S. PATENT DOCUMENTS

| | | | |
|---|---|---|---|
| 8,108,301 | B2 | 1/2012 | Gupta et al. |
| 8,386,378 | B2 | 2/2013 | Halper et al. |
| 9,196,007 | B1 | 11/2015 | Thomas |
| 10,019,588 | B2 * | 7/2018 | Garcia ............ G06F 21/604 |
| 10,366,451 | B2 | 7/2019 | Kaznady |
| 10,621,664 | B2 | 4/2020 | Rosenblatt et al. |
| 10,679,285 | B1 | 6/2020 | Kurani et al. |
| 10,891,655 | B1 | 1/2021 | Flowers et al. |
| 11,037,195 | B1 | 6/2021 | Puri |
| 2004/0078296 | A1 | 4/2004 | Dykes et al. |
| 2006/0036524 | A1 * | 2/2006 | Capanna ............ G06Q 40/00 705/35 |
| 2006/0129478 | A1 | 6/2006 | Rees |
| 2007/0208641 | A1 | 9/2007 | Smith et al. |
| 2009/0037323 | A1 | 2/2009 | Feinstein et al. |
| 2009/0112753 | A1 | 4/2009 | Gupta et al. |
| 2009/0222313 | A1 | 9/2009 | Kannan et al. |
| 2011/0106693 | A1 | 5/2011 | Halper et al. |
| 2013/0073386 | A1 | 3/2013 | Rose et al. |
| 2013/0325604 | A1 | 12/2013 | Yeri et al. |
| 2014/0006202 | A1 | 1/2014 | Frohwein et al. |
| 2014/0114838 | A1 | 4/2014 | Nunes et al. |
| 2015/0081590 | A1 | 3/2015 | Avrick |
| 2015/0112854 | A1 | 4/2015 | Guriel et al. |
| 2015/0142713 | A1 | 5/2015 | Gopinathan et al. |
| 2015/0294407 | A1 | 10/2015 | Weiss |
| 2015/0317728 | A1 | 11/2015 | Nguyen |
| 2016/0140654 | A1 * | 5/2016 | Bhat ............ G06Q 10/06316 705/7.26 |
| 2017/0169511 | A1 | 6/2017 | Kelly |
| 2017/0206365 | A1 | 7/2017 | Garcia et al. |
| 2017/0213280 | A1 | 7/2017 | Kaznady |
| 2017/0221142 | A1 | 8/2017 | McDonald et al. |
| 2017/0330058 | A1 | 11/2017 | Silberman et al. |
| 2018/0253657 | A1 | 9/2018 | Zhao et al. |
| 2018/0285969 | A1 | 10/2018 | Busch et al. |
| 2018/0349986 | A1 | 12/2018 | Fidanza et al. |
| 2019/0043070 | A1 | 2/2019 | Merrill et al. |
| 2019/0114704 | A1 | 4/2019 | Way et al. |
| 2020/0058041 | A1 | 2/2020 | Bharwani et al. |
| 2020/0134716 | A1 | 4/2020 | Lahrichi et al. |
| 2020/0279323 | A1 | 9/2020 | Li |
| 2020/0286124 | A1 | 9/2020 | Hiremath et al. |
| 2020/0311808 | A1 | 10/2020 | Srivastava et al. |
| 2020/0387923 | A1 | 12/2020 | Mitchell |
| 2021/0182492 | A1 | 6/2021 | Cole et al. |
| 2021/0201239 | A1 * | 7/2021 | Milkovic ............ G06Q 30/0208 |
| 2021/0256485 | A1 | 8/2021 | Fidanza et al. |
| 2021/0295427 | A1 | 9/2021 | Shiu et al. |
| 2022/0058730 | A1 | 2/2022 | Albers et al. |

* cited by examiner

USER INTERFACES FOR CONTEXTUAL MODELING FOR ELECTRONIC LOAN APPLICATIONS

BACKGROUND

Financial institutions provide loans to customers. Before a loan is issued to a customer, the customer applies for the loan. The loan application process can include a number of stages that must be completed, requirements that must be complied with, and conditions that must be fulfilled, before an applied-for loan is approved or underwritten.

SUMMARY

Embodiments of the disclosure are directed to a common decisioning solution provided across multiple points of engagement with a financial product customer or potential customer. Particular aspects and examples described herein include a system for managing an electronic loan application process.

According to aspects of the present disclosure, a system comprises: one or more processors; and non-transitory computer-readable storage encoding instructions which, when executed by the one or more processors, causes the system to: generate a contextual model for each of a plurality of context types, each of the contextual models defining a multi-dimensional virtual space including a plurality of segments, each of the segments defining a plurality of segment elements, each of the segment elements corresponding to a dimension of the multi-dimensional virtual space; receive data associated with a loan application; parse the data into individual data elements; associate the individual data elements with one of the context types; virtually position the individual data elements in the multi-dimensional virtual space of the contextual model corresponding to the context type, including to: match the data elements and the segment elements of the plurality of segments; and based on the match: (i) align the received data with one of the segments; or (ii) create a new segment corresponding to the received data; and automatically perform an action associated with the loan application based on the position and the associated context type.

In another aspect, a computer-implemented method comprises: generating a contextual model for each of a plurality of context types, each of the contextual models defining a multi-dimensional virtual space including a plurality of segments, each of the segments defining a plurality of segment elements, each of the segment elements corresponding to a dimension of the multi-dimensional virtual space; receiving data associated with a loan application; parsing the data into individual data elements; associating the individual data elements with one of the context types; virtually positioning the individual data elements in the multi-dimensional virtual space of the contextual model corresponding to the context type, including: matching the data elements and the segment elements of the plurality of segments; and based on the match: (i) aligning the received data with one of the segments; or (ii) creating a new segment corresponding to the received data; and automatically performing an action associated with the loan application based on the position and the associated context type.

Yet another aspect is directed to a system for managing an electronic loan application process. The system comprises: one or more processors; and non-transitory computer-readable storage encoding instructions which, when executed by the one or more processors, causes the system to: generate a contextual model for each of a plurality of context types, each of the contextual models defining a multi-dimensional virtual space; receive data associated with a loan application; parse the data into individual data elements; associate the individual data elements with one of the context types; virtually position the individual data elements in the multi-dimensional virtual space of the contextual model corresponding to the context type matching the individual elements with corresponding clusters of learned data elements for the associated context type; and based on the position, apply to the received data one or more rules associated with the corresponding clusters, causing the system to: automatically predict whether the loan application will be accepted or rejected for underwriting; and based on the automatically predict, automatically perform an action associated with the loan application.

Yet another aspect is directed to a system for managing an electronic loan application, including: one or more processors; and non-transitory computer-readable storage encoding instructions which, when executed by the one or more processors, cause the system to generate a user interface including: a loan information pane listing financial information associated with a loan transaction, the financial information including details of the loan transaction and an indicator of a status of an attribute of the loan transaction; an action pane listing upcoming actions associated with the loan transaction; and an assets pane listing assets associated with the loan transaction, the assets pane including: a list with each of the assets, including identification of each of the assets; and a statement pane for a selected asset of the assets, the statement pane listing items associated with a statement for the selected asset, with each of the items including a status indicator and a highlighted excerpt from the statement.

The details of one or more techniques are set forth in the accompanying drawings and the description below. Other features, objects, and advantages of these techniques will be apparent from the description, drawings, and claims.

DESCRIPTION OF THE DRAWINGS

FIG. 11 is another example user interface for the system of FIG. 6.

FIG. 12 is another example user interface for the system of FIG. 6.

DETAILED DESCRIPTION

Figure 1:
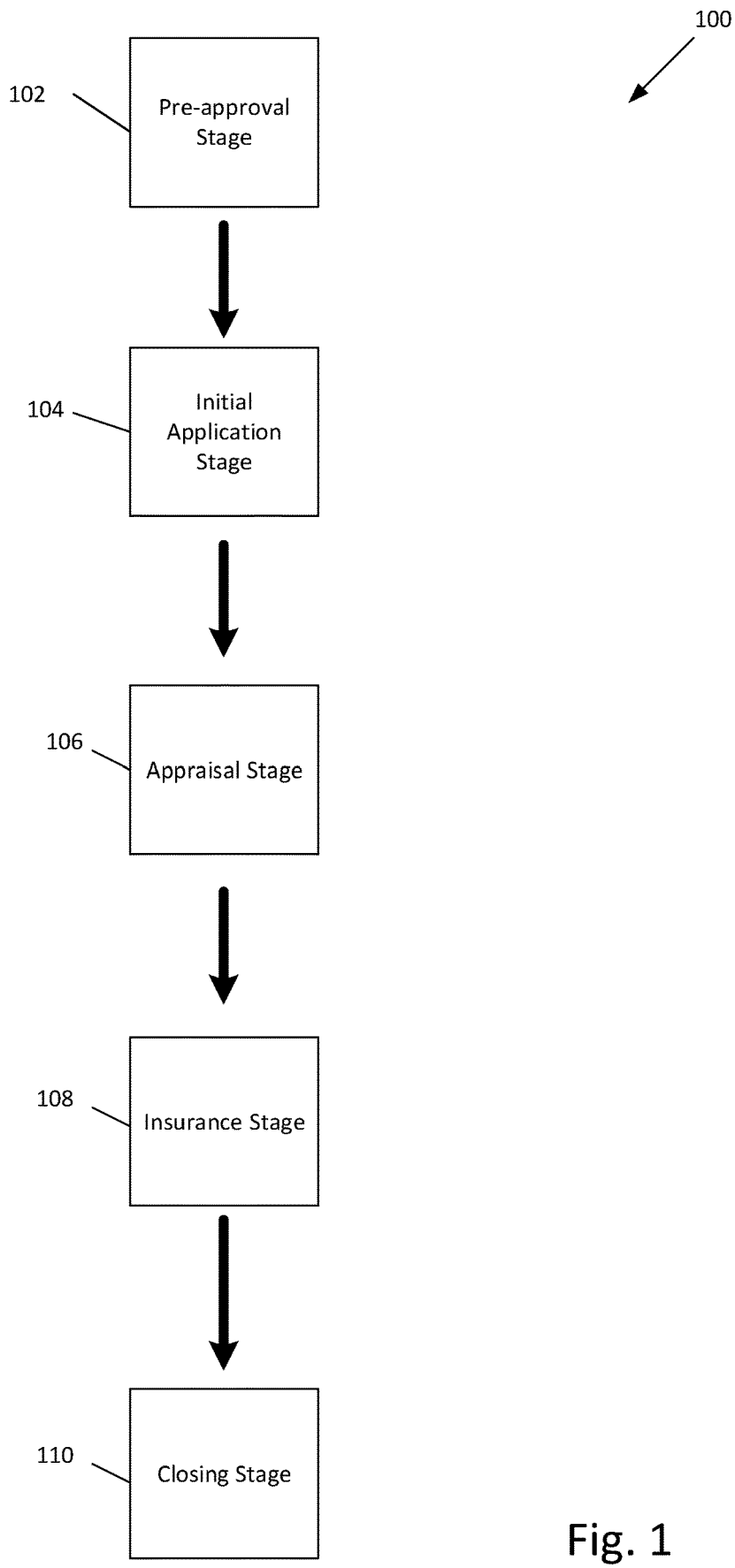
FIG. 1 schematically shows an example loan application process.

Financial institutions provide loans to customers. To obtain a loan, the customer must apply for the loan, initiating a process. In the case of a home mortgage application process, for example, certain disclosures must be made to the customer, the customer must make various representations to prove their credit worthiness, the home must be inspected and appraised on behalf of the lender, title and homeowners insurance must be obtained by the customer, and so forth. In some cases, approval of a loan or particular parameters of a loan, such as the interest rate, is contingent on the customer's selling of their current home, new construction of a home being complete, establishing another financial relationship with the financial institution (e.g., by opening a withdrawal or investment account with the financial institution) and/or other pre-conditions.

A typical loan application process is a dynamic and often protracted process with multiple parties involved and a variety of evolving and potentially changing circumstances that can impact previously completed steps in the process.

Embodiments of the disclosure are directed to a common decisioning solution provided across multiple points of engagement with a customer or potential customer, such as a customer of a financial product. Particular aspects and examples described herein are directed to a system for managing an electronic loan application process or one or more workplans of a loan application process. A "workplan" can be a predefined discrete stage of a loan application process that involves a set of predefined tasks or activities that define a responsibility pattern that is specific to the workplan. A typical loan application process includes multiple workplans. For example, for a mortgage application process, an example workplan is a homeowners insurance workplan that involves a set of tasks required to obtain and validate adequate homeowners insurance for the property being purchased. Thus, each workplan is designed around a single responsibility pattern that can be developed using contextual modeling aspects described herein, and managed dependently of, other workplans of a given loan application process. The modularized nature of workplans allows for multiple workplans of a given loan application process to be managed in parallel, e.g., simultaneously, rather than sequentially. Thus, for example, the occurrence of an exception in one workplan of a loan application process that requires human intervention to resolve need not pause or delay progress or completion of another workplan in the loan application process, thereby expediting the overall loan application process.

The present disclosure is directed to systems and methods that employ data driven decision automation (DDDA, or 3DA). Embodiments of the present disclosure are particularly applied in the lending industry, but in other examples, may be applicable to other financial industries. For example, features of the present disclosure use data to automate decisions relating to commercial loans, mortgage loans, home equity loans and so forth. Typically, the decisions occur during a loan application process. A loan application process consists of multiple workplans that involve multiple parties, culminating in either an acceptance or a rejection by the lender of the loan application. If the loan application is accepted, the lender is in a position to issue the loan to the customer.

For example, in the case of a home mortgage loan application, the loan application process can include, without limitation, a pre-approval stage, an application stage, an inspection and appraisal stage, an underwriting stage, and a closing stage. Associated with each stage are one or more workplans and one or more parties, such as the customer, the lender, an appraiser, a homeowners insurance provider, a title insurance provider, etc. Additionally associated with one or more of the stages is required documentation, such as a loan application, the customer's financials (e.g., tax returns, pay stubs, bank account statements, retirement account statements, asset statements, retirement plan summaries etc.), the property title, a homeowners insurance policy, a title insurance policy, etc. Additionally associated with one or more of the stages are issues of regulatory compliance, such as disclosures that the lender is required by law to provide to the customer, requirements relating to types and parameters of loans that are permitted, requirements relating to title and homeowners insurance, requirements related to independent appraisals and inspections of the property, and so forth.

At any stage during a loan application process, an event can occur. The event can be expected or unexpected. The event can impact one or more active workplans, and can thereby impact current, previous, and future stages of the loan application process. The event can be driven internally, e.g., by the customer and/or the lender, such as the customer losing their job. The event can be driven externally, such as the occurrence of a natural disaster or a severe economic downturn. The event can be a sudden change in the regulatory or statutory framework that governs the applied-for loan or a significant drop in market-driven interest rates. The event can be a failure of a loan precondition to occur. For example, the event can be a defect in property title, a defect in the home construction, expiration of an interest rate lock, failure of the customer to obtain funds from sale of their current home, or an appraisal that is lower than the purchase price for the home.

Aspects of the present disclosure employ machine learning algorithms to classify such events without human input. The event is classified as one that can be automatically accounted for and incorporated across the loan application process without human input, or as an exception with respect to one or more defined workplans that does require human input in order for the impacted workplan(s) to progress. In this manner, disruption to the loan application process and to the steps and workplans in the process that have already been completed can be minimized. For example, an event that may otherwise have required a person to review the event's impact on each of ten different and already completed and submitted documents by revisiting and resubmitting those documents one by one, is instead automatically accounted for by adjusting, based on the event, only the workplan that is actually impacted by the event.

Aspects of the present disclosure employ machine learning algorithms to automatically recognize and classify data introduced during the loan application process without human intervention or oversight, such that the process and application status are automatically updated with the latest data and documents. The system is configured to recognize submission of new data that was missing as well as modifications to previously submitted information. For example, the customer may be identified as a customer in one document, as a buyer in another document, and as the insured in another document. The system recognizes that all three pieces of data represent the same entity, thereby automatically reconciling between the three documents without human input.

Advantageously, the system is configured to automatically take actions relating to the loan application in response to receiving data and placing that data in a previously constructed or presently constructed context model using algorithmic classifications. Such automated actions can include, for example, accepting or rejecting a document, modifying a document or a loan parameter, approving or rejecting a loan application, preparing a document or information to provide such document or information to the relevant party for review, modification and/or signature by the receiving party, issuing a prompt to a party (e.g., the customer) to submit further information or documentation, generating and disseminating notifications to relevant parties about the status of the loan application and what actions need to be taken by those receiving parties to advance the loan application, etc.

Another advantage of the contextual modeling approach to loan applications described herein includes the ability of the system to proactively learn from data as it is acquired in real time.

Another advantage of the contextual modeling approach to loan applications described herein includes the ability of the system to learn how to anticipate changes in a loan application process, and how to address those changes while minimizing disruptions to the process.

Another advantage of the contextual modeling approach to loan applications described herein is quicker decision timing when the system decides, without human intervention, whether to advance the loan application.

Another advantage of the contextual modeling approach to loan applications described herein includes the ability of the system to automatically generate insights related to specific loan applications and automatically generate insights about parties involved in the loan application, such as characteristics and tendencies of a customer. Those insights can then be used in a given active loan application, as well as processes outside of the loan application, e.g., for managing a broader banking relationship with the customer. Thus, for example, the contexts that are built can be reused in different scenarios outside of a loan application, such as for marketing, customer relationship building and maintaining, etc.

In examples of the disclosed systems and methods, machine learning algorithms employed in accordance with the present disclosure can include supervised and/or unsupervised learning models using statistical methods. The learning models can be trained to infer classifications. The learning models can use vector space and clustering algorithms to group similar data inputs. When using vector space and clustering algorithms to group similar data, the data can be translated to numeric features that can be viewed as coordinates in a n-dimensional space. This allows for geometric distance measures, such as Euclidean distance, to be applied. There is a plurality of different types of clustering algorithms than can be selected. Some cluster algorithms such as K-means work well when the number of clusters is known in advance. Other algorithms such as hierarchical clustering can be used when the number of clusters is unclear in advance. An appropriate clustering algorithm can be selected after a process of experimental trial and error or using an algorithm configured to optimize selection of a clustering algorithm.

In particular examples of the present disclosure, a particular context (a document context, a loan context, or a customer context) is defined. Each context is made of a set of learned segments having a plurality of segment elements. Each segment element corresponds to a dimension of the n-dimensional space.

Groups of segment elements can also be categorized in one of a plurality of predefined categories based on how the groupings of data can be used in given loan application workplan. Such categories can include, for example, a customer category, a lender category, a compliance category and an environment (or environmental) category.

In examples of the disclosed systems and methods, the learning models can use Bayesian networks and/or other machine learning algorithms to identify new and statistically significant data associations and apply statistically calculated confidence scores to those associations, whereby confidence scores that do not meet a predetermined minimum threshold are eliminated. Bayesian networks are algorithms that can describe relationships or dependencies between certain variables. The algorithms calculate a conditional probability that an outcome is highly likely given specific evidence. As new evidence and outcome dispositions are fed into the algorithm, more accurate conditional probabilities are calculated that either prove or disprove a particular hypothesis. A Bayesian network essentially learns over time.

In examples of the disclosed systems and methods, other machine learning algorithms can be selected, including, for example, linear regression, logistic regression, support vector machines, and neural networks.

Examples of contexts and classifications within multi-dimensional context models and how they are developed and then used in a given workplans of a loan application will be described in greater detail below.

Systems of the present disclosure use computer hardware to manage a loan application. The loan application process can be managed by one or more server computers. The one or more server computers include one or more processors that execute computer-readable instructions. The one or more server computers can be internal to the lender (e.g., the financial institution issuing the loan), or exterior to, but accessible by, the lender. The server computer(s) obtain data from a plurality of sources and then apply software applications or modules stored in non-transitory-computer readable storage to appropriately incorporate that data into the impacted loan application workplans and automatically execute one or more actions based on the workplan, the data that has been obtained, and the data that has not yet been obtained.

The one or more server computers need to interface with electronic devices associated with parties involved in the loan application process in order to receive data and output information regarding the loan application. The interfacing can take place over a network 217 (FIG. 2), such as the Internet, or one or more intranets associated with one or more of the parties involved in the loan application. The electronic devices associated with the parties can include, for example, smart phones, tablet computers, desktop computers, laptop computers, and so forth.

These electronic devices include input and output interfaces whereby data is transmitted to the one or more servers and is received from the one or more servers. The input and output interfaces can include screens, including touch screens that function as two-dimensional or three-dimensional display devices. Using application programming interfaces (APIs), third party display devices can be used and configured to display graphical user interfaces that can both output data that can be obtained by the server computer of the financial institution and receive data input. The input and output interfaces can also include audio devices, such as microphones and speakers, optical devices, such as cameras, and other devices, such as keyboards, mice and the like.

Data can be obtained during the loan application process from any of a number of different sources, including automated electronic data acquisition devices. For example, data can be obtained from audio sessions with the customer in which the customer answers questions related to a loan application using an electronic device associated with the customer and an electronic device associated with an employee of the lender. An automatic speech recognition device and natural language processor used by a server computer (e.g., a server computer of the lender) can digitalize the speech and parse the digitalized speech into data objects for contextualizing and performance of automated actions. An image scanner used by the server computer can obtain data from a paper document and use the data for contextualizing and performance of automated actions. A web crawling machine used by the server computer can obtain data from various webpages containing loan-relevant information and use the data for contextualizing and automated actions. In certain examples, data may also be obtained prior to the loan application process. For instance this may occur prior to (or as part of) a customer engagement strategy, such as part of a pre-decisioned offer. Such data may be obtained from the sources described herein, and may be leveraged to create dynamic experience based on existing knowledge about a customer.

The system can be connected via a network to a transaction card reader that automatically obtains information related to a loan application from the transaction card reader when, e.g., the customer executes a transaction with their transaction card at the transaction card reader. Electronic biometric identity devices, such as face, eye, and/or fingerprint scanners can be used by the server computer to confirm the identify of a customer or another relevant party during one or more stages of the loan application process.

The one or more server computers can also obtain, via a network, data from a number of different third-party databases. Such databases can include, for example, government databases that store taxpayer information, statutory and regulatory information, zoning information, property lien information, survey and title information, homeowners' association information, and so forth. Other databases can include those of credit rating associations, real estate organizations, financial aggregator organizations, other financial institutions, insurance providers, etc. Pre-authorization may be needed, e.g., from the customer, before the lender is granted access to information related to the customer's loan application from one or more of these databases.

FIG. 1 shows a schematic representation of an example home mortgage application process 100 in accordance with the present disclosure. At each stage in the process, data is obtained and evaluated and one or more actions occur. Each stage in the process includes one or more workplans. Workplans in different stages can be managed and advance in parallel, e.g., simultaneously. Thus, while the process 100 reflects a general flow of progression for a given loan application, the specific stages need not be managed or completed in the sequence that is depicted.

The data obtained at each stage is contextually classified according to an existing context model of an impacted workplan and/or used to create a new context model and/or to update an existing context model. Depending on the classification of data and the confidence in the classification using machine learning algorithms, the data is automatically incorporated into the loan application process and/or used to automatically trigger one or more actions. Alternatively, the data is tagged as an exception that requires human intervention to address the exception before the data can be incorporated into the impacted workplan(s).

The loan application process 100 includes a pre-approval stage 102. In the pre-approval stage 102, personal and financial data about the customer is obtained, as well as data reflecting basic parameters of the desired loan, such as down payment percentage, loan term, and selection of a fixed versus variable interest rate. The lender evaluates the data and determines how much they would be willing to lend to the customer at a preliminarily set interest rate based on then-existing market conditions.

Following the pre-approval stage 102, there is an application initiation stage 104 in which the customer applies for a loan on a particular home that the customer desires to purchase. In the stage 104, the lender obtains information about the home to be purchased, including the accepted price offer and the address, and makes various disclosures to the customer regarding details of the loan being applied for. In addition, the customer submits financial documentation evidencing their credit worthiness and ability to pay for the desired home. The customer also submits a copy of the executed contract of sale and proof of payment of the partial down payment at the time of contract. In some cases, the customer also provides the lender with contact information about their broker or real estate agent and/or their real estate attorney.

Following the application initiation stage 104, there is a home appraisal stage 106. During the home appraisal stage, the home desired to be purchased is inspected and appraised. The appraisal is received by the lender and shared with the customer. Depending on the outcome of the appraisal, the loan application can either continue or terminate if the appraisal is too low for the lender to provide adequate financing for the home purchase.

If the loan application process 100 advances beyond the appraisal stage 106, an insurance acquisition stage 108 occurs. In this stage, insurance, such as title insurance and homeowners insurance are obtained and documentation of the insurance policies is submitted to the lender.

In the underwriting stage 108, the lender reviews all of the data and documentation, determines whether it is complete and whether it meets various criteria, and also determines whether any loan preconditions have been met. If the data is complete and the preconditions are met, the lender approves the loan application for underwriting, and the application process advances to the closing stage 110, at which point the approved loan is issued by the lender. At any point during the loan application process 100, an event, as described above, can occur, which can impact one or more workplans. Depending on the nature of the event, the system of the present disclosure can either handle the event automatically using contextual modeling, or identify the event as an exception that must be resolved with human intervention. In at least some examples, however, workplans that are not impacted by the exception can continue progressing while the exception is being resolved.

Figure 2:
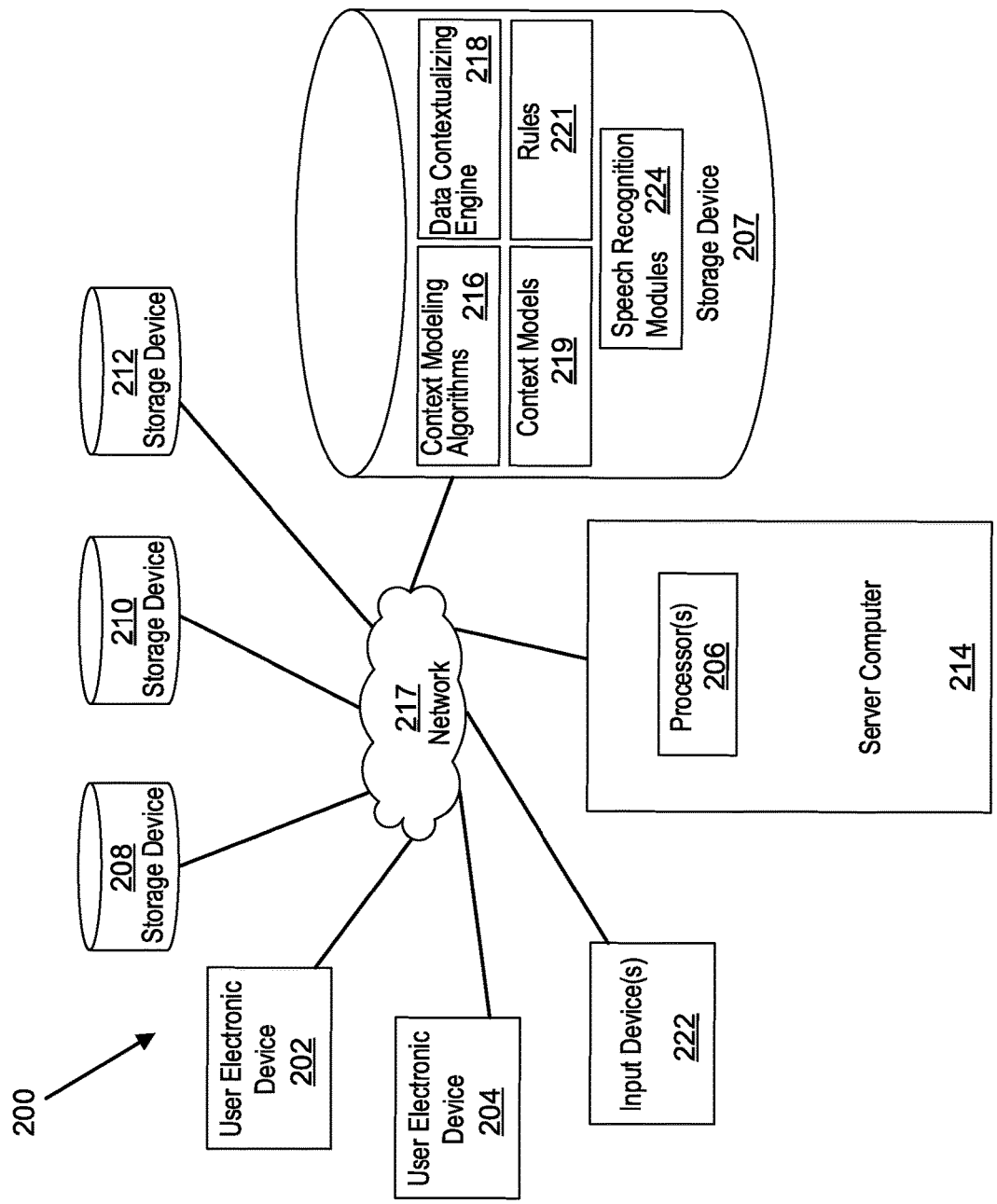
FIG. 2 schematically shows an example system that can manage loan applications in accordance with the present disclosure.

FIG. 2 schematically shows aspects of an example system 200 of the present disclosure. The system 200 includes user electronic devices 202, 204, one or more processors 206, and one or more storage devices 208, 210, 212.

The one or more processors 206 can run on a server computer 214 (or "server") managed by, or otherwise associated with, an enterprise (e.g., a financial institution such as a bank, brokerage firm, mortgage company, or any other money lending enterprise) that uses the system 200 for loan application workplans.

Each user electronic device 202, 204, can be associated with one of the parties involved in the loan application process, such as the customer, the lender, a real estate broker or agent, an attorney, an insurance provider, an appraiser, etc.

Each of the storage devices 207, 208, 210, 212 can include non-transitory computer readable-memory or databases that store data, e.g., in the form of tables, and software modules, e.g., in the form of computer-readable instructions. One or more of the storage devices can be managed internally by the financial institution, and one or more of the storage devices can be managed externally by third parties associated with the loan application process. For example, the internal database 207 includes software modules executed by the processor(s) 206 of the server computer 214. These modules can include, for example, machine learning context modeling algorithms 216, and a data contextualizing engine 218 that uses context models 219 generated by the context modeling algorithms 216 and stored on a storage device 208 to classify obtained data during a loan application process. The data contextualizing engine 218 is configured to classify and contextualize data obtained during the application process within a multi-dimensional virtual space representing a context and, based on the contextualization and confidence level of the contextualization, determine if the data can be automatically incorporated into an impacted workplan without declaring an exception to be handled manually by a human. If an exception does occur, a notification can be generated at an electronic device associated with financial institution personnel. Using their electronic device, the personnel can evaluate and resolve the exception to allow the impacted workplan or workplans to progress.

Another internal storage device of the storage devices 208, 210, 212 can store additional financial data of the customer, such as bank account information, transaction card account information, investment account information, and so forth, to the extent the customer has used the lender for deposits and other forms of borrowing and/or financial servicing. Internal storage devices can also store documentation related to the loan application process, such as disclosure documents and loan application forms.

The external storage devices of the storage devices 208, 210, 212, can store third party information relevant to the loan application, such as property records, municipal maintenance records, homeowner association records, credit ratings, insurance policies, government regulations and statutes, zoning laws, etc.

The user electronic devices 202, 204 include input devices 220 by which the server computer 214 obtains data. The server computer 214 can also obtain data via other input devices 222, which can correspond to any of the electronic data acquisition devices described above, such as, a microphone, a camera, an image scanner, a web crawling machine, a transaction-card reader, biometric identity devices, etc.

The software modules can include one or more speech recognition modules 224 that can provide automatic speech recognition and natural language processing of natural speech captured by the one of the input devices 222. The digitalized speech is then treated as input data that can be used to build a new context model, and/or contextualized according to an existing or presently developing multi-dimensional context and incorporated into one or more workplans or tagged as an exception.

An automatic speech recognition device and natural language processor used by a server computer (e.g., a server computer of the lender) can digitalize the speech and parse the digitalized speech into data objects for building a new context model and/or contextualizing the data objects. An image scanner used by the server computer can obtain data from a paper document and use the data in context modeling and/or contextualizing of the scanned data. A web crawling machine used by the server computer can obtain data from various webpages containing loan-relevant information and use the data in context modeling and/or contextualizing the crawled data. The system can be connected via a network to a transaction card reader that automatically obtains information related to a loan application from the transaction card reader when, e.g., the customer executes a transaction with their transaction card at the transaction card reader. Electronic biometric identity devices, such as face, eye, and/or fingerprint scanners can be used by the server computer to confirm the identify of a customer or another relevant party during one or more stages of the loan application process.

A context model organizes data attributes and standardizes how the data attributes relate to one another. Necessarily, creation of the context model precedes creation of a context.

In this example, each context model, regardless of the context type of the context model, is defined in an n-dimensional virtual space (e.g., a vector space) made up of segments having segment elements, where each segment element represents one of the dimensions of the space. Segments can be added or modified as the system learns, e.g., by supervised or unsupervised learning, from acquired data. For example, the system can develop and refine its context models as it handles more and more loan applications. For a new loan application, as data comes in, the data is associated with the appropriate context type and analyzed and placed in a cluster in the n-dimensional virtual space based on the data's relationship or closeness to a cluster or clusters, e.g., by matching the segment to an already learned segment with at least a predefined minimum confidence. Based on the placement in the n-dimensional space, one or more automated actions in one or more impacted workplans occur. Alternatively, the data is identified as an exceptional event that is passed on to a human (e.g., personnel of the financial institution via an electronic device) to review and resolve the exception before the impacted workplan progresses. In examples, unimpacted workplans can continue progressing in parallel while the exception is being handled.

Groups of segment elements can be assigned a category, including one of a compliance category, a customer category, a lender category, and an environment category.

The compliance category includes segment element groupings relating to, e.g., regulatory and other requirements of loan applications. Such element groupings can include, for example, Home Mortgage Disclosure Act (HMDA) requirements, TILA-RESPA Integrated Disclosure (TRID) requirements, other federal, state, and local rules requirements pertaining to home purchases, locality specific zoning laws, property liens, land use easements and covenants, flood certification, independent property value appraisals, etc.

The customer category consists of segment element groupings relating to customer classifications and customer identifying information. Such elements can include, for example, personal and contact information about the customer, customer bank and investment account information, customer income, customer transaction card accounts, customer assets, customer debts and liabilities, customer marital status, customer family status (e.g., number of children, life stage of children), customer's current residence, location of the home to be purchased, customer's current living arrangement (e.g., owner, renter), and whether the loan approval is contingent on customer-specific contingencies, such as completing a sale of a customer's current home.

The lender category consists of segment element groupings relating to lender requirements for loan applications and other lender insights and knowledge relating to loan applications. In examples, lender dimension segment element groupings relate to acquisition of insurance relating to the property, such as homeowners (e.g., homeowners) insurance, title insurance, etc.

The environment category consists of segment element groupings relating to circumstances external to the customers, external to the compliance, and external to the lender, that can impact the loan application. Such segment element groupings can include, for example, natural and human-driven disaster elements, housing market elements, elements relating to a local or national economy, etc.

For purposes of loan applications, in some examples there are three context types, including a document context type, a customer context type, and a loan context type.

A document context is a content per document type. The context is built based on the document's data. More specifically, a document context is a set of insights learned from the document data, from people who have experience with similar documents, and from previous processes, e.g., workplans involving similar documents. Document data is received by the server computer. Each document context is then associated with a versioned context model. When a new version of a document context is introduced, the new version can be learned in order to incorporate it into the document context model for contextualizing subsequent documents. Thus, the document context model dictates when a new version of document context can be used.

A customer context is a context per customer (e.g., a customer) that is built based on information about the customer known to the lender (e.g., from existing bank or transaction card accounts, prior loan inquires etc.), and other customer-related data that may be available from third party sources such as government databases. When a new version of a customer context is introduced to the system, the new version can be learned in order to use it for contextualizing subsequent customers. Thus, the customer context model dictates when a new version of a customer context can be used.

A loan context is a context per loan type. More specifically, a loan context is a set of insights learned from obtained loan data, people, and process regarding different loans. When a new version of a loan context is introduced to the system, the new version can be learned in order to use it for contextualizing subsequent loans. Thus, the customer context model dictates when a new version of a customer context can be used.

Building Context Models

For each context type, a model is built using machine learning algorithms as described above. Building a model is an iterative process. As new data is obtained (or "acquired") that is relevant to the context type of the model, the obtained data is processed in a series of steps. These steps are repeated for each new data acquisition, e.g., for each new loan version, each new customer version, and each new document version.

Figure 3:
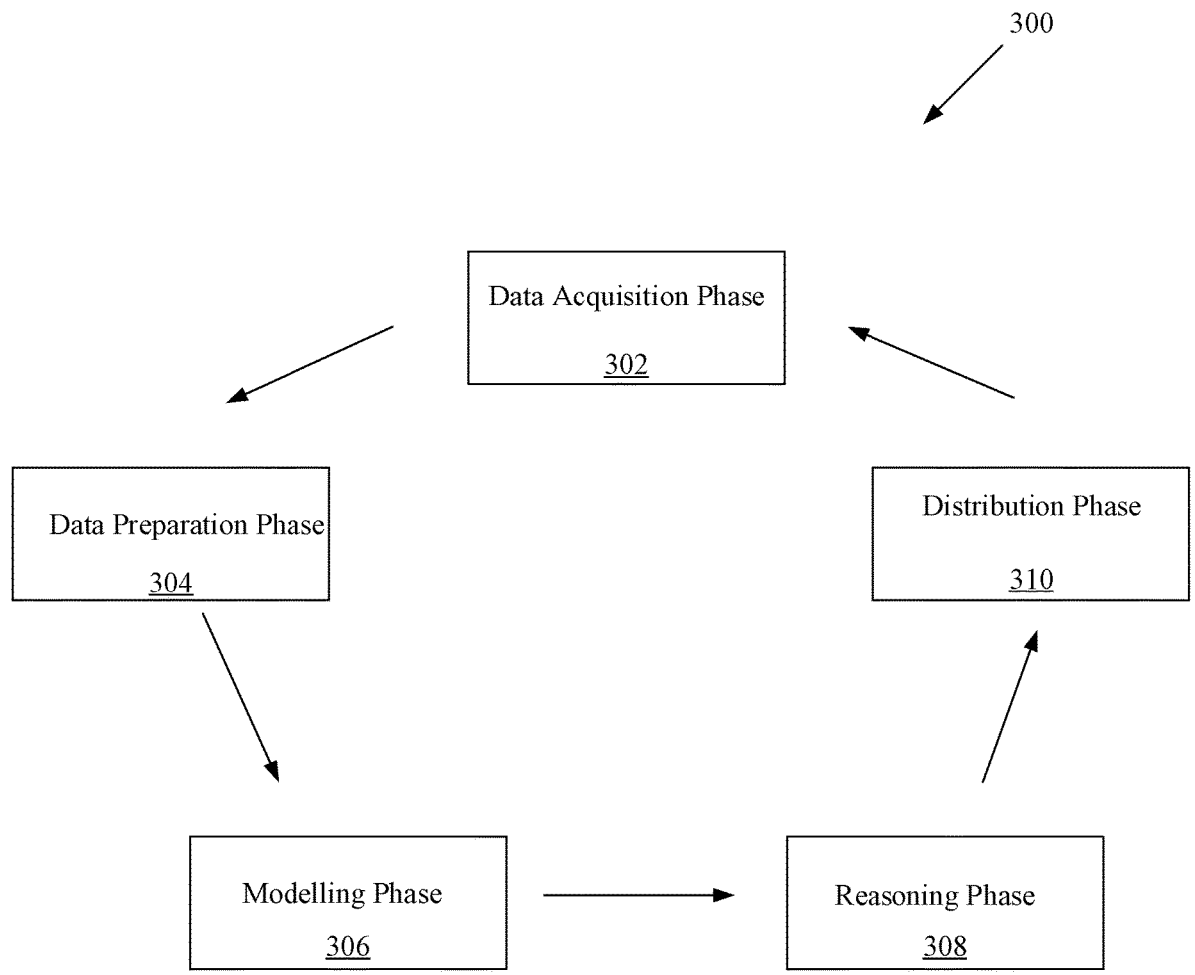
FIG. 3 is an example process flow that can be performed by the system of FIG. 2.

Referring to FIG. 3, an example context model building life cycle 300 is shown. The life cycle 300 includes a data acquisition phase 302, a data preparation phase 304, a modeling phase 306, a reasoning phase 308, and an approval and distribution phase 310.

At the data acquisition phase 302, data is retrieved from various sources, as described above, through batch or real time events. In an example document context model, a data acquisition event is receipt of a homeowners insurance document for a home. In an example loan context model, a data acquisition event is a receipt from an underwriter of a likelihood of a loan approval. In an example customer context model, a data acquisition event is obtaining personal and financial information about a particular customer seeking a loan from a database of the lender or a third-party database.

At the data preparation phase 304, the acquired data is transformed, sanitized and flattened by the one or more processors of the server computer to convert that data into more readable and searchable format by the machine learning algorithms.

At the modeling phase 306, a model is created or updated, for the given context type, based on the acquired and prepared data, and using the context modeling algorithms 216 (FIG. 2).

The modeling phase 306 will be described in the context of an example document context. In this example, the acquired data is a homeowners insurance document for a home sought to be purchased by the customer. The data acquired and prepared from the homeowners insurance document includes a plurality of data elements, including, e.g., a document type element, a customer name element, a property address element, an evidence of property element, policy active period element, a policy status element, an insured amount element, contact details elements, a loan number element, a policy number element, a policy term element, an expiry date element, insurance coverage elements (e.g., dwelling coverage, personal property coverage, medical expenses coverage, personal liability coverage, theft coverage, wind coverage, flood coverage, earthquake coverage), insurance agent details elements, a deductible element, etc.

In some examples, at the modeling phase 306, the acquired data elements are matched, using machine learning algorithms, with corresponding but different- or like-labeled data elements in other documents. For example, the label for the customer data element can be Employee in a tax document (e.g., a W2 document) while the corresponding data element in a homeowners insurance document can be Customer or Borrower or Client or Policy Holder. Matching data elements across different contexts within a given context type (e.g., a W2 context and a homeowners insurance context within the document context type) can allow the system to perform automatic cross-referencing of information actions between different documents in different workplans of a loan application to automatically advance the loan application without human intervention. For instance, in order for a homeowners insurance document to be approved, it may have to be cross-referenced with information from a property appraisal document. The matching of different elements across different contexts and workplans can allow this approval, in some circumstances, to be performed automatically without human intervention.

Similarly, for purposes of creating segments in a multi-dimensional space for a model of a given document type, the context modeling algorithms can group semantically equal words to correspond to a single data element (i.e., a single dimension) of a segment, thereby simplifying the model and expediting use of the model. For instance, in a homeowners insurance document, Name, Customer Name, and Insured Name can be grouped as a single data element type. Street name and Street Type can be grouped as a single data element type. Directions, such as South West and SW can be grouped as a single data element type. Mailing Address, Communication Address, and Contact Address can be grouped a single data element type. Country Code and Country Name can be grouped as a single data element type.

In some examples, the modeling phase 306 includes organizing groups of data elements by assigning each group to one of a plurality of predefined categories. The category-based groupings of data elements can facilitate modeling and contextualizing of newly acquired data and incorporating the data in one or more workplans, e.g., by cross-referencing and matching groups of data elements based on their assigned categories against different requirements. In examples, the categories include a compliance category, a customer category, a lender category and an environmental category, as described above.

In an example of using data element groupings, a document context grouping of data elements relating to mortgage insurance can be assigned the compliance category and thereby easily matched with the corresponding mortgage insurance compliance requirements to determine if the requirements have been met. For instance, it is a compliance requirement that every loan should have mortgage insurance and for the lender to disclose in the Good Faith Estimate or Loan Estimate document provided to the customer the existence of any mortgage insurance. When a mortgage insurance document is received, data elements are acquired from the mortgage insurance document and assigned to the compliance category, allowing the system to quickly ascertain if the relevant compliance requirements have been met, and then automatically performing an action (completing workplan, issuing a notification of incomplete information, etc.) based on the evaluation.

At the modeling phase 306, segments of prepared data elements of the acquired data are created building clusters of elements in intelligent ways for loan application workplans using context modeling algorithms 216 and incorporating and positioning the newly acquired data elements relative to those clusters to create segments. In some examples, data elements' relationships with the categories (compliance, environment, customer, lender) described above can be used to form the clusters. In addition, semantic similarity of data elements as described above can be used to create intelligent clustering of data elements. In addition, or alternatively, segments and clusters can be created manually based on experience and knowledge of industry professionals.

Examples of useful customer context type segments and clusters that can be created using these methods include: segments and clusters for customers who are employed with income greater than a predefined threshold, segments and clusters for customers who have existing health issues and work in high-risk occupations; segments for customers with a credit score classified as meeting a given threshold; segments for customers having a home loan greater than a predefined amount and having homeowners insurance and an escrow account; and segments for customers having a home loan greater than a predefined amount and having homeowners insurance but not having an escrow account.

An example of a useful loan context type segment that can be created using these methods includes loan segments for loans with homeowners insurance and an escrow account; and loan segments for loans with homeowners insurance and no escrow account. An example of useful document context type segments that can be created using these methods include a document segments for mortgage insurance policy document for a property located in a state which is prone to flood, earthquake, or fire.

At the reasoning phase 308, rules, or a weighting or scoring strategy are applied to the segments of the context to determine and select the segments that are sufficiently useful in loan application process to incorporate as part of a context model.

At the versioning and distribution phase 310, the context model resulting from the selected segments is saved, e.g., in a database. If the new context model is approved (which can be after human review or automatic) the new context model is made accessible and usable by the modeling algorithms 216 and a data contextualizing engine 218 for future model development by the modeling algorithms 216, and for future contextualizing of acquired data by the contextualizing engine 218, as described in greater detail below.

Contextualizing Acquired Data Using Existing Context Models

Figure 4:
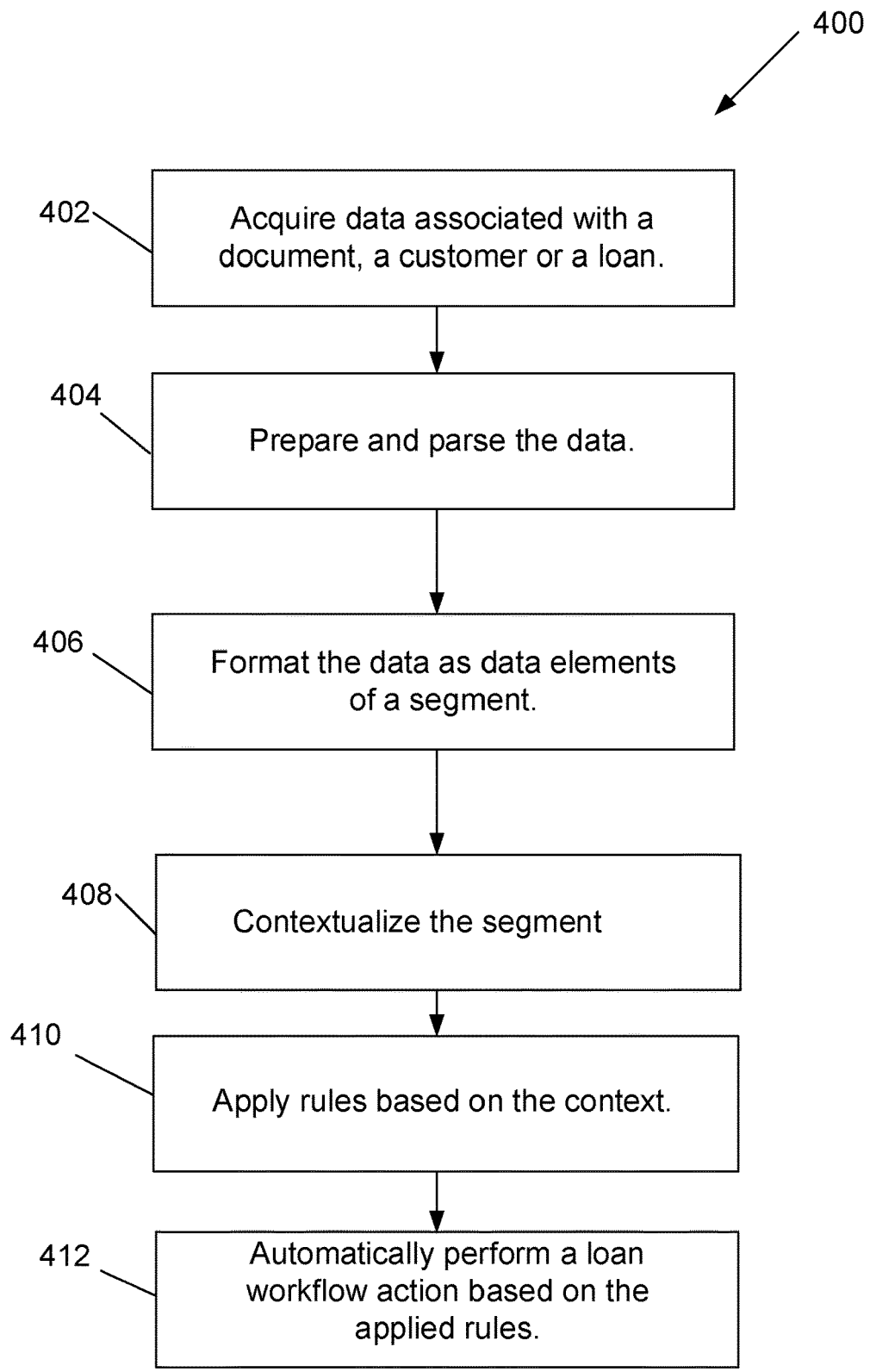
FIG. 4 is another example process flow that can be performed by the system of FIG. 2.

Referring to FIG. 4, an example method 400 of using an already built and saved context model (using the life cycle 300) to incorporate obtained data into one or more impacted workplans of a loan application process, to perform one or more actions with respect to the impacted workplan(s), and/or to modify the already built context model, will be described. All steps of the method 400 can be performed automatically by the system processors executing computer-readable instructions stored on non-transitory computer-readable storage.

In the example method 400 applied to a document context type, at a step 402, a homeowners insurance document associated with an active loan application workplan is acquired by the server computer of the financial institution from an external source, e.g., from a homeowners insurance provider or from the customer intending to purchase a home. Data from the document is extracted using a document data extraction tool run or used by the financial institution's server computer. In some examples in the data acquisition step 402 or the step 404, words extracted from the document are grouped with other words that are semantically similar.

At the step 404, the acquired data is prepared by identifying the types of data it contains, e.g., by parsing the data. For example, types of data extracted from an acquired homeowners insurance document can include the customer's name and contact details, the loan number, the loan type, the insurance policy number, the active period of the policy, the status of the policy, the term of the policy, the expiration date of the policy, the property address, the property owner, the insurance agent's name and contact information, the amount of insurance coverage for the dwelling, the amount of insurance coverage for personal property, the amount of a deductible, the amount of insurance coverage for medical expenses, the amount of expenses for personal liability, etc.

At the step 406, the extracted and prepared data is formatted as a segment with a plurality of segment elements. The step 406 can include organizing groups of data elements by assigning each group to one of a plurality of predefined categories as described above, such as a compliance category, a customer category, a lender category and an environmental category.

The segment is then positioned at step 408 in a multi-dimensional document-type contextual space using one or more clustering algorithms to contextualize the acquired document based on an already built and learned contextual model for a homeowners insurance document.

The step 408 can include associating the received document's data types (e.g., the data of the segment representing the received document) with a particular contextual model or multiple contextual models and then comparing the types of data of the received document with the types of data of the model to align the received document's segment to an already modeled segment within a predefined acceptable tolerance or confidence. Using this placement of the segment in the multi-dimensional space that also defines the corresponding contextual model, it is determined whether the acquired document is complete. For example, it is determined whether the document includes data for each data type of the associated model. Machine learning can be employed over time to automatically determine whether a received document has complete information with sufficiently high confidence, e.g., 100 percent confidence.

If it is determined that the received document is incomplete or if there is insufficient confidence in the completeness of the document, an automated notification can be issued to the appropriate party to complete the document, and/or the document can be tagged as an exception requiring human intervention to resolve.

If it is determined that the received document is complete, with sufficiently high confidence, the data contextualizing engine 218 (FIG. 2) applies rules 221 (FIG. 2) at the step 410 to determine if the homeowners insurance document can be accepted. The rules 221 can be pre-loaded and/or machine-learned. The applied rules 221 check the acquired homeowners insurance document against the corresponding document context model to determine whether the homeowners insurance document is acceptable. For example, the acquired document is compared against the model, whose associated model rules require that the property address not be in a flood zone, and that the document includes evidence of a defined premium and coverage, rather than estimates.

At a step 412, an action occurs with respect to the impacted workplan(s) and based on the modeling at the step 408 and the applied rules. For example, if it is determined that the acquired document meets the conditions set forth in the applicable rules, the automatic action of the document being automatically accepted occurs without human evaluation or intervention. Otherwise, the document is rejected. If the document is accepted, the impacted workplan(s) automatically advance(s).

If the document is rejected, a notification can be automatically issued identifying the defects in the document and prompting rectifying action to be taken. Depending on the nature of the rejection, the rules 221 can cause an exception to be identified that must be handled by an employee of the financial institution or of another entity associated with the application. The relevant party is notified of the exception and prompted to intervene before the workplan can proceed.

Alternatively, if an existing learned context cannot be found to match and model the segment of data elements of the acquired document with sufficient confidence (e.g., the acquired document does not sufficiently align with parameters of previous documents), the segment can be treated as a new document context (or context version) about which a new model can be developed or about which the existing model can be refined. For example, if no existing document context model version for a homeowners insurance policy document is associated with a rule for when the property address associated with the insurance policy is in a flood zone, a new segment can be created that does contemplate a house in a flood zone, and a rule (e.g., reject loan application) is associated with the new segment.

In the example method 400 applied to a customer context type, at the step 402 data about the customer is acquired. The data can include, for example, the customer's name, age, marital status, address, target home, income, occupation, assets, liabilities, employment history, credit score, etc. The data can be pooled from different sources, such as databases both internal and external to the financial institution. In some examples in the data acquisition step 402 or the step 404, words extracted from the acquired data are grouped with other words that are semantically similar.

At the step 404, the acquired data is prepared for further processing by, e.g., flattening and sanitizing the data, and by identifying the types of data that have been acquired, e.g., by parsing the data.

At the step 406, the extracted and prepared data is formatted as a segment with a plurality of segment elements. The step 406 can include organizing groups of data elements by assigning each group to one of a plurality of predefined categories as described above, such as a compliance category, a customer category, a lender category and an environmental category.

The segment is then positioned in a multi-dimensional customer-type contextual space at the step 408 using one or more clustering algorithms to contextualize the acquired data based on an already built and learned contextual model for a customer.

The step 408 can include associating the received data types (e.g., the data of the segment representing the received customer data) with a particular contextual model or multiple contextual models and then comparing the types of received customer data with the types of data of the model to align the received data's segment to an already modeled segment within a predefined acceptable tolerance or confidence. Using this placement of the segment in the multi-dimensional space that also defines the corresponding contextual model, the customer is contextualized according to a prior customer, or more particularly, to a model that represents an aggregate of prior customers. For example, the segment can be placed in the multi-dimensional space to align with a segment or cluster corresponding to an already learned context of a customer of age 40, who is employed and has income more than a predefined income amount, liabilities less than a predefined liabilities amount, and a credit score greater than a predefined credit score amount.

Based on this positioning in the multi-dimensional space to contextualize the acquired customer data, one or more automated decisions can be made by applying rules 221 at the step 410 already associated with the corresponding context model. For example, the context model can be associated with a rule that the customer should be recommended for a loan (e.g., a mortgage) of a certain amount.

At the step 412, the associated action occurs. In this case, at the step 412, an employee of the financial institution can be automatically prompted to offer the customer the decided loan amount, and/or a notification is automatically (i.e., without human intervention) generated and sent to the customer themselves offering the decided loan amount. The segment and decision made with respect to the segment can also be incorporated into the existing contextual model to further refine the contextual model for future contextualizations of customers.

Alternatively, if an existing learned context cannot be found to match and model the segment of data elements of the customer with sufficient confidence (e.g., the customer does not sufficiently align with parameters of previous customers), the segment can be treated as a new customer context (or customer context version) about which a new model can be developed or with which an existing model can be refined. In this case, contextualization of the acquired customer data may be insufficient to perform an automated action to advance a loan application workplan. Instead, for example, an exception can be identified and an employee of the financial institution can be automatically notified to intervene and evaluate the new customer and determine how to develop the relationship between the financial institution and the customer.

In the example method 400 applied to a loan context type, at the step 402 data regarding the status of an existing loan application is acquired. The data can include, for example, the loan ID, the loan terms (e.g., mortgaged property address, interest rate, type of interest rate, expiration of the loan, loan refinancing options, loan prepayment options, loan recasting options, etc.), the status of the loan application, customer identifying data, acquired insurance data, acquired customer asset data, acquired customer liability data, acquired customer employment data, etc. The data can be pooled from different sources, such as databases both internal and external to the financial institution. In some examples in the data acquisition step 402 or the step 404, words extracted from the acquired data are grouped with other words that are semantically similar.

At the step 404, the acquired data is prepared for further processing by, e.g., flattening and sanitizing the data, and by identifying the types of data that have been acquired, e.g., by parsing the data.

At the step 406, the extracted and prepared data is formatted as a segment with a plurality of segment elements. The step 406 can include organizing groups of data elements by assigning each group to one of a plurality of predefined categories as described above, such as a compliance category, a customer category, a lender category and an environmental category.

The segment is then positioned in a multi-dimensional loan-type contextual space at the step 408 using one or more clustering algorithms to contextualize the acquired data based on an already built and learned contextual model for a loan.

The step 408 can include associating the received data types (e.g., the data of the segment representing the received customer data) with a particular contextual model or multiple contextual models and then comparing the types of received customer data with the types of data of the model to align the received data's segment to an already modeled segment within a predefined acceptable tolerance or confidence. Using this placement of the segment in the multi-dimensional space that also defines the corresponding contextual model, the loan is contextualized according to a prior loan, or more particularly, to a model that represents an aggregate of prior loans. For example, the segment can be placed in the multi-dimensional space to align with a segment corresponding to an already learned context of a loan corresponding to a customer having a credit score in a predefined high range and income greater than a predefined amount. In another example, the segment can be placed in the multi-dimensional space to align with a segment corresponding to an already learned context of a loan corresponding to a customer having a credit score in a predefined medium range and liabilities in a predefined high range.

Based on this positioning in the multi-dimensional space to contextualize the acquired loan data, one or more automated decisions can be made by applying rules 221 at step 410 already associated with the corresponding context model. For example, the context model can be associated with a rule that the desired loan should or should not be underwritten.

At the step 412, the associated action occurs. In this case, at the step 412, the loan is either automatically approved for underwriting or rejected for underwriting and notification of this action can be automatically provided to an appropriate employee of the financial institution, and/or to the customer. The segment and decision made with respect to the segment can also be incorporated into the existing contextual model to further refine the contextual model for future contextualizations of loans.

The automated action can also be a prediction based on the proximity of the new loan segment to existing loan context models. For example, the automated action can be a prediction as to whether a loan will or not be underwritten in a future stage of the loan application process.

Alternatively, if an existing learned context cannot be found to match and model the segment of data elements of the loan with sufficient confidence, the segment can be treated as a new loan context (or loan context version) about which a new model can be developed or with which an existing model can be refined. In this case, contextualization of the acquired loan data may be insufficient to perform an automated action for an impacted workplan to progress. Instead, for example, an exception can be identified and an employee of the financial institution can be automatically notified to intervene and evaluate the loan and determine how to proceed with the impacted workplan.

Figure 5:
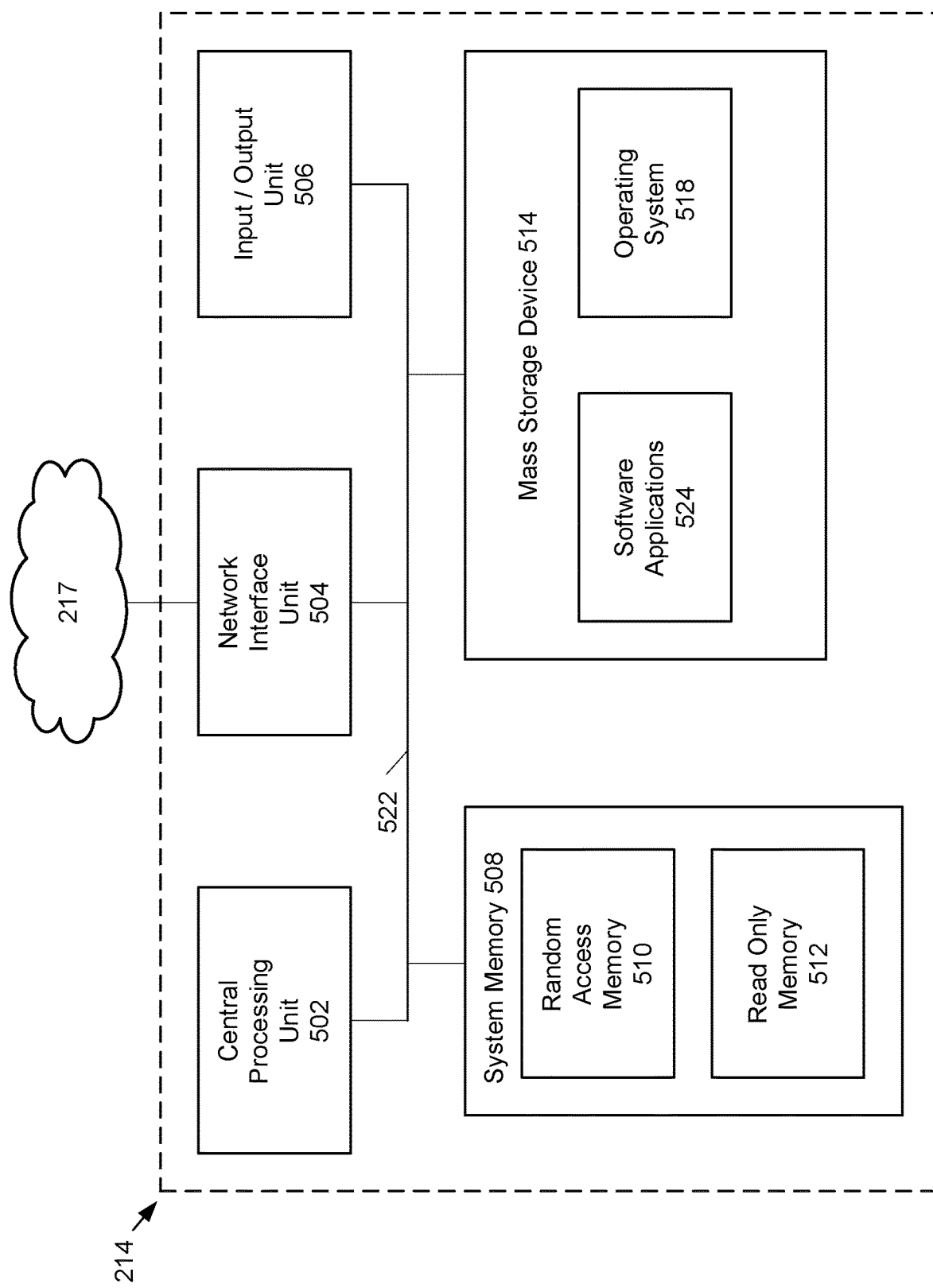
FIG. 5 schematically shows example physical components of portions of the system of FIG. 2.

As illustrated in the example of FIG. 5, server computer 214 includes at least one central processing unit ("CPU") 502, a system memory 508, and a system bus 522 that couples the system memory 508 to the CPU 502. The system memory 508 includes a random access memory ("RAM") 510 and a read-only memory ("ROM") 512. A basic input/output system that contains the basic routines that help to transfer information between elements within the server computer 214, such as during startup, is stored in the ROM 512. The server computer 214 further includes a mass storage device 514. The mass storage device 514 is able to store software instructions and data. A central processing unit, system memory and mass storage device similar to that in FIG. 5 are also included in other computing devices disclosed herein (e.g., electronic devices 202, 204).

The mass storage device 514 is connected to the CPU 502 through a mass storage controller (not shown) connected to the system bus 522. The mass storage device 514 and its associated computer-readable data storage media provide non-volatile, non-transitory storage for the server computer 214. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the server computer 214.

According to various embodiments of the invention, the server computer 214 may operate in a networked environment using logical connections to remote network devices through the network 217, such as a wireless network, the Internet, or another type of network. The server computer 214 may connect to the network 520 through a network interface unit 504 connected to the system bus 522. It should be appreciated that the network interface unit 504 may also be utilized to connect to other types of networks and remote computing systems. The server computer 214 also includes an input/output controller 506 for receiving and processing input from a number of other devices, including a touch user interface display screen, or another type of input device. Similarly, the input/output controller 506 may provide output to a touch user interface display screen or other type of output device.

As mentioned briefly above, the mass storage device 514 and the RAM 510 of the server computer 214 can store software instructions and data. The software instructions include an operating system 518 suitable for controlling the operation of the server computer 214. The mass storage device 514 and/or the RAM 510 also store software instructions and applications 524, that when executed by the CPU 502, cause the server computer 214 to provide the functionality of the server computer 214 discussed in this document. For example, the mass storage device 514 and/or the RAM 510 can store the machine learning context modeling algorithms 216, the data contextualizing engine 218, the context models 219, the rules 221, and the speech recognition modules 224 (FIG. 2).

Figure 6:
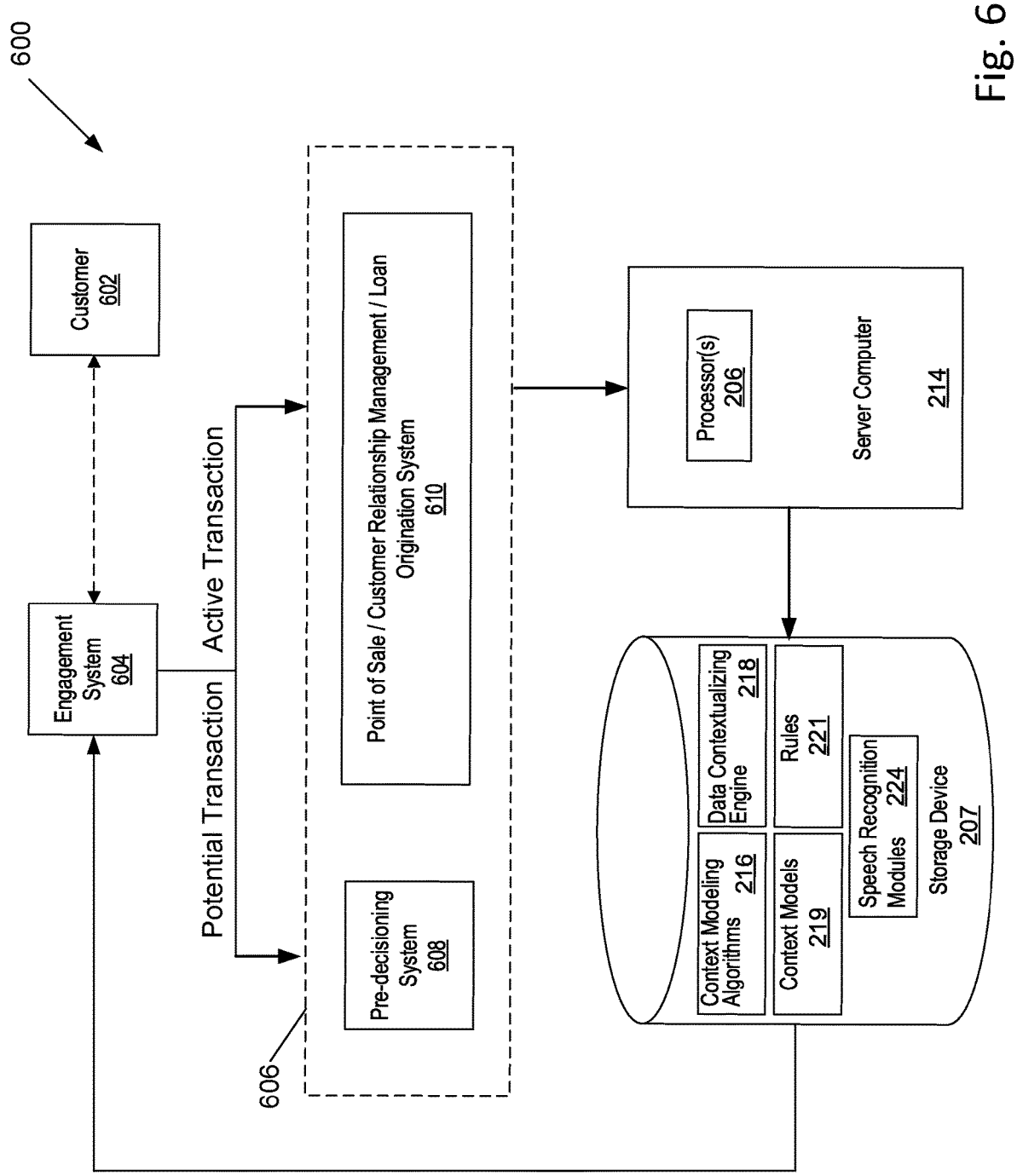
FIG. 6 schematically shows another example system that can manage loan applications including pre-decisioning.
Figure 7:
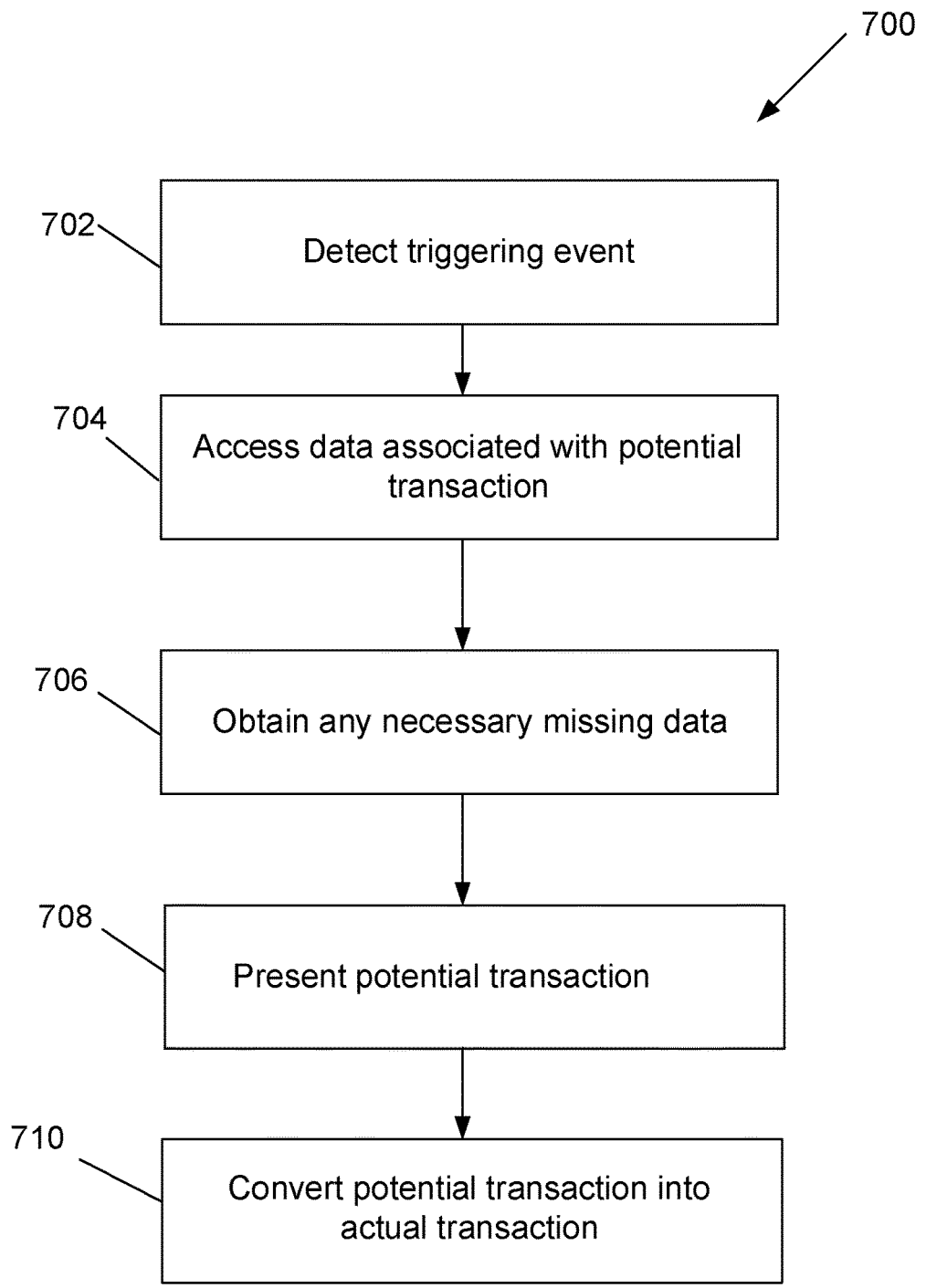
FIG. 7 is an example process flow that can be performed by the system of FIG. 6.

Referring now to FIGS. 6-7, another example system 600 is illustrated. Generally, the system 600 functions in a manner similar to that of the system 200, in that the system 600 employs data driven decision automation (DDDA, or 3DA) to automate decisions relating to financial transactions, like commercial loans, mortgage loans, home equity loans, etc.

In this example, the system 600 also provides a common decisioning solution across multiple points of customer engagement. This allows the system 600 to manage loan transactions initiated through standard channels as well as other customer engagement opportunities that result in an offer being partially or completely "pre-decisioned."

A pre-decisioned offer is a potential transaction that is generated before a specific request or approval for the transaction is received from the customer. This pre-decisioning creates a dynamic application experience that leverages existing knowledge about the customer and only requests further information that is needed from the customer to make the pre-decisioned offer.

For instance, a communication can be received from the customer for an unrelated activity or transaction, such as the transfer of money from one account to another. This request triggers the pre-decisioning of an offer to the customer for a potential transaction, such as a mortgage for the purchase of a new home or the refinancing of an existing mortgage.

In these examples, the server computer 214 and the storage device 207 are agnostic with respect to whether the transaction is a potential transaction or an active transaction. In both instances, the system 600 employs the data driven decision automation to automate decisions relating to the potential or active transaction. In such a scenario, the server computer 214 is programmed to track the type of transaction and implement the appropriate workplans. The system 600 also facilitates the transition of a potential transaction generated through pre-decisioning into an active transaction, as described below.

Referring now to FIG. 6, this system 600 includes the storage device 207 and the server computer 214 of the system 200 described above. As described previously, the server computer 214 and the storage device 207 of the system 600 are programmed to make decisions that facilitate a loan application process. This loan application process consists of multiple workplans that involve multiple parties, culminating in either an acceptance or a rejection of a transaction by the lender of a loan application.

In addition, the system 600 includes an engagement system 604 and transaction management system 606, which are programmed to facilitate both active transactions and provide pre-decisioning for potential transactions.

The engagement system 604 is programmed to facilitate interaction with a customer 602. In the examples provided previously, this interaction could be the receipt of a request from the customer 602 for a loan. In this scenario, the engagement system 604 is an interface between the customer 602 and a point of sale/customer relationship management/loan origination system 610 of the transaction management system 606 to facilitate an active transaction that is handled by the storage device 207 and the server computer 214 using the data driven decision automation described herein.

The engagement system 604 is further programmed to facilitate interaction between the customer 602 and a pre-decisioning system 608 that manages a potential transaction with the customer 602.

In this example, the pre-decisioning system 608 is activated through various interactions (or triggering events) associated with the customer 602. These interactions can be received through various communications channels, such as a telephone inquiry received from the customer 602, an online or mobile wallet transaction received from the customer 602, etc. These triggering events can be separate from or otherwise unassociated with a specific request for a loan transaction, as described below.

When activated, the pre-decisioning system 608 communicates with the server 214 to initiate the data driven decision automation for generating a potential transaction. This process, which is depicted in FIG. 7, includes the server computer 214 accessing information about the customer 602 to facilitate pre-decisioning to generate the offer for the potential transaction.

This information for pre-decisioning can be received from the customer 602 during the interaction(s) with the customer 602. For example, a current financial status could be received from the customer 602 as part of an ancillary or unrelated transaction. In another example, the information for pre-decisioning may be associated with and sourced by a user account (e.g., deposit account, credit account, etc.) that the customer has with the financial institution. In various examples, the information is sourced from one or more disparate systems/sources that may not be directly associated with presenting an offer to a customer. For instance, the information may be sourced from one or a combination of a marketing system, a point of sale system, and a customer resource management system, to name a few examples. The financial status information is leveraged by the pre-decisioning system 608 to generate the offer for the potential transaction.

Further, the server computer 214 can access this information about the customer 602 from internal storage devices for financial data associated with the customer 602, such as bank account information, transaction card account information, investment account information, and so forth, to the extent the customer 602 has used the lender for deposits and other forms of borrowing and/or financial servicing.

In addition, the information for the customer 602 can be obtained from external storage devices having third party information relevant to the loan application, such as property records, municipal maintenance records, homeowner association records, credit ratings, insurance policies, government regulations and statutes, zoning laws, etc.

Once this information about the customer 602 is obtained, the pre-decisioning system 608 communicates with the server computer 214 to determine if there is sufficient information to prepare an offer for the potential transaction with the customer 602. Should additional information about the customer 602 be needed to complete the pre-decisioning, the engagement system 604 is programmed to obtain the necessary information from the customer 602 prior to or in conjunction with presentation of the potential transaction to the customer 602.

This can be an iterative process that involves the server computer 214 continuing to access information until an offer for the potential transaction can be made. The iterative process can span different interactions with the customer 602 until sufficient information is obtained to present the potential transaction to the customer 602 per the pre-decisioning process.

If approval of the potential transaction is received from customer 602 once presented, the potential transaction is transitioned by the transaction management system 606 from the potential transaction to an active transaction. This transition allows the server computer 214 to assign various resources to the workplan associated with the active transaction as the system 600 continues to employ the data driven decision automation described herein.

Referring now to FIG. 7, an example method 700 is shown for generating a potential transaction through pre-decisioning, such as by the pre-decisioning system 608.

At a step 702, a triggering event for the pre-decisioning is detected. As noted, this triggering event can be separate from or otherwise unassociated with any loan transaction. In many ways, the pre-decision is a "pro-active" offer that anticipates the interests or needs of a customer or potential customer.

For example, the triggering event can be as simple as an unrelated communication with the customer, such as receipt of a customer request like an account balance inquiry or transfer through various communication channels, like telephone, online, mobile wallet, etc. The triggering event can alternatively be detection of a change in a condition associated with the customer, such as a change in the customer's financial condition, like an increase in assets. In another example, the triggering event is based upon detection of a change in an external condition, like a change in mortgage rates that impacts the ability to qualify for a loan.

Once the triggering event is detected, at a step 704 information is collected about the customer to facilitate the pre-decisioning for the potential transaction. As noted, this information can be obtained from various sources, such as from interaction(s) with the customer, internal sources having financial information known about the customer, and external sources having information about the customer, like credit reporting agencies.

Next, at a step 706, any missing information that is needed for the pre-decisioning process is obtained. This missing information can be obtained from the customer, such as by having the engagement system 604 present the customer 602 with one or more questions and/or confirmations. Further, the information can be obtained through the iterative process associated with multiple communications with the customer 602 over time. For instance, over a series of interactions, the pre-decisioning system 608 can obtain sufficient information about the customer 602 to generate the offer for the potential transaction.

At a step 708, the potential transaction is presented once the pre-decisioning process receives the necessary information. The potential transaction can be presented through the same communication channel as the triggering event. For instance, when the triggering event is a call received from the customer at a call center, the engagement system is programmed to prompt a customer service representative assisting the customer to convey the offer for the potential transaction. Further, the potential transaction can be presented through a different communication channel, such as sending the offer for the potential transaction through an electronic communication (e.g., email or toast notification) in response to a telephonic triggering event. Many configurations are possible. In one instance, the potential transaction is generated and provided as a display within a user interface of a financial institution webpage, online account, or mobile account. For example, the potential transaction may appear as a window, a banner advertisement, a card display, a pop-up display, or another user interface within a user account display at a financial institution once that user accesses the user account (e.g., an online banking account, a mobile banking account, etc.). That is, the potential transaction may automatically appear to the user (via a display of a user device) once sufficient information to generate the offer is available.

Finally, at a step 710, the potential transaction is transitioned into an actual transaction upon receiving acceptance by the customer, as further described above. For example, the offer for the potential transaction can be presented in an email, user interface, text message, etc., to the customer with a control, such as a link, that is clickable for acceptance.

Upon receiving selection of the control for acceptance by the customer, the customer can be transitioned to the workplan for an active transaction, which may include collection of additional information, assignment of resources, etc. For instance, portions of the workplan can be suppressed while the transaction is in a potential state during pre-decisioning. Upon acceptance, those portions of the workplan are activated. Accordingly, in at least some examples described herein the process 700 may lead to a process of using an already built and saved context model (using the life cycle 300) to incorporate obtained data into one or more impacted workplans of a loan application process, such as is described herein with reference to at least FIG. 4.

One example workplan that can be suppressed during a potential transaction is the appraisal process. Once a potential transaction is transitioned to an active transaction, the workplan associated with the appraisal is activated by the system. Many other configurations are possible.

Referring now to FIGS. 8-12, example graphical user interfaces are shown that support the data driven decision automation of the systems 200, 600 described herein. These interfaces generally convey information associated with a potential or active transaction and facilitate data correction and confirmation of that information within the contextual flow of the transaction. That is, in certain examples the graphical user interfaces shown and described offer a visualization of the contextualized information, and specifically, a visualization of information and context that may be made by the systems 200, 600 across various disparate data sources. When a correction is made, the systems 200, 600 will reevaluate the potential or active transaction and provide further guidance for data correction and confirmation, as needed.

Figure 8:
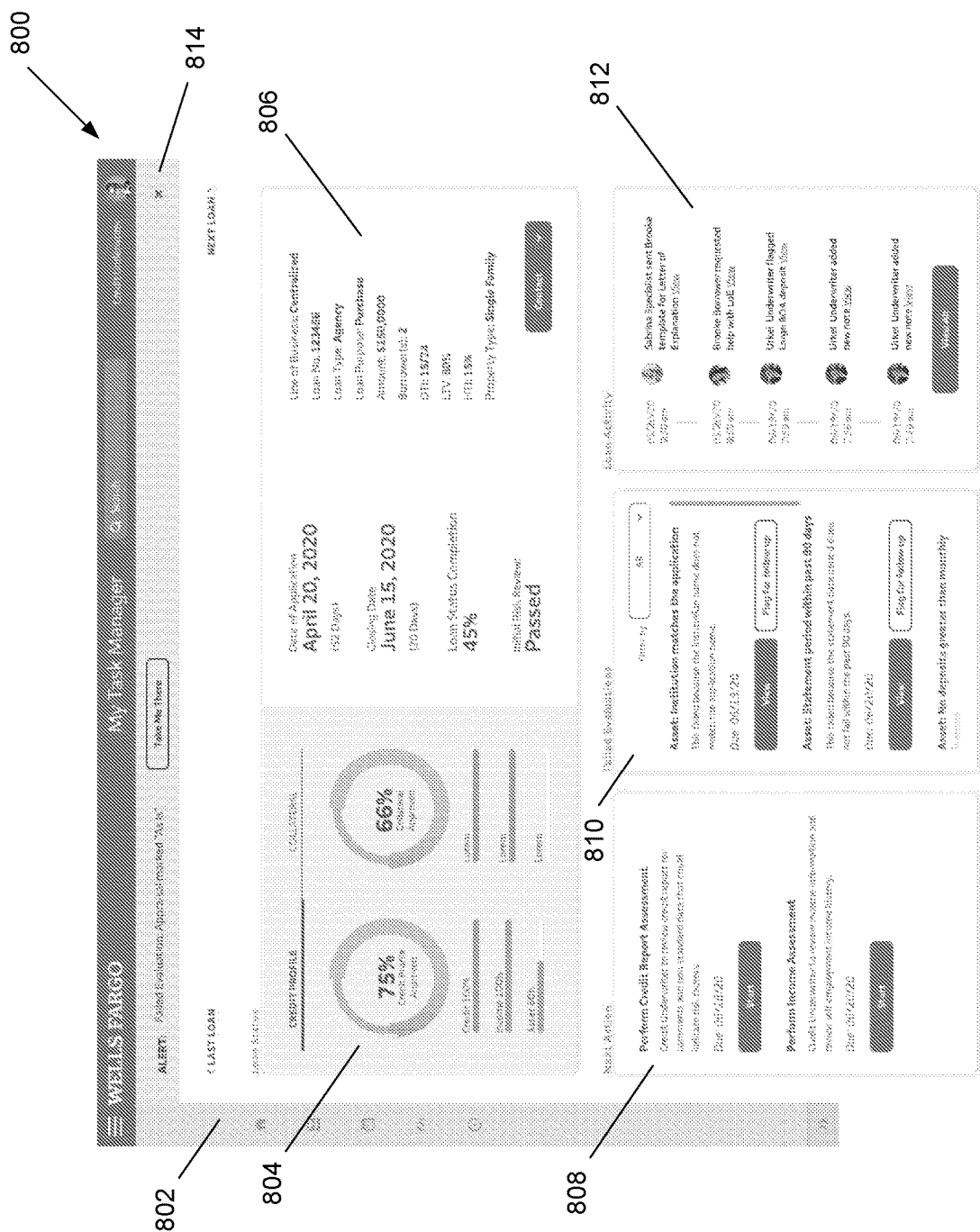
FIG. 8 is an example user interface for the system of FIG. 6.

Referring now to FIG. 8, an example interface 800 is provided that displays information about a potential or active transaction. In this example, the transaction is a home mortgage. The interface 800 provides a customer service representative with information about the transaction.

The interface 800 is configured to provide information about the transaction efficiently and quickly so that the decision points associated with the transaction are readily discernable. For instance, the interface 800 employs graphics (e.g., circle and line bars), color (e.g., green for good and orange/red for issues, warnings, failures), and icons to rapidly orient the user (i.e., the customer service representative in this instance).

Figure 11:
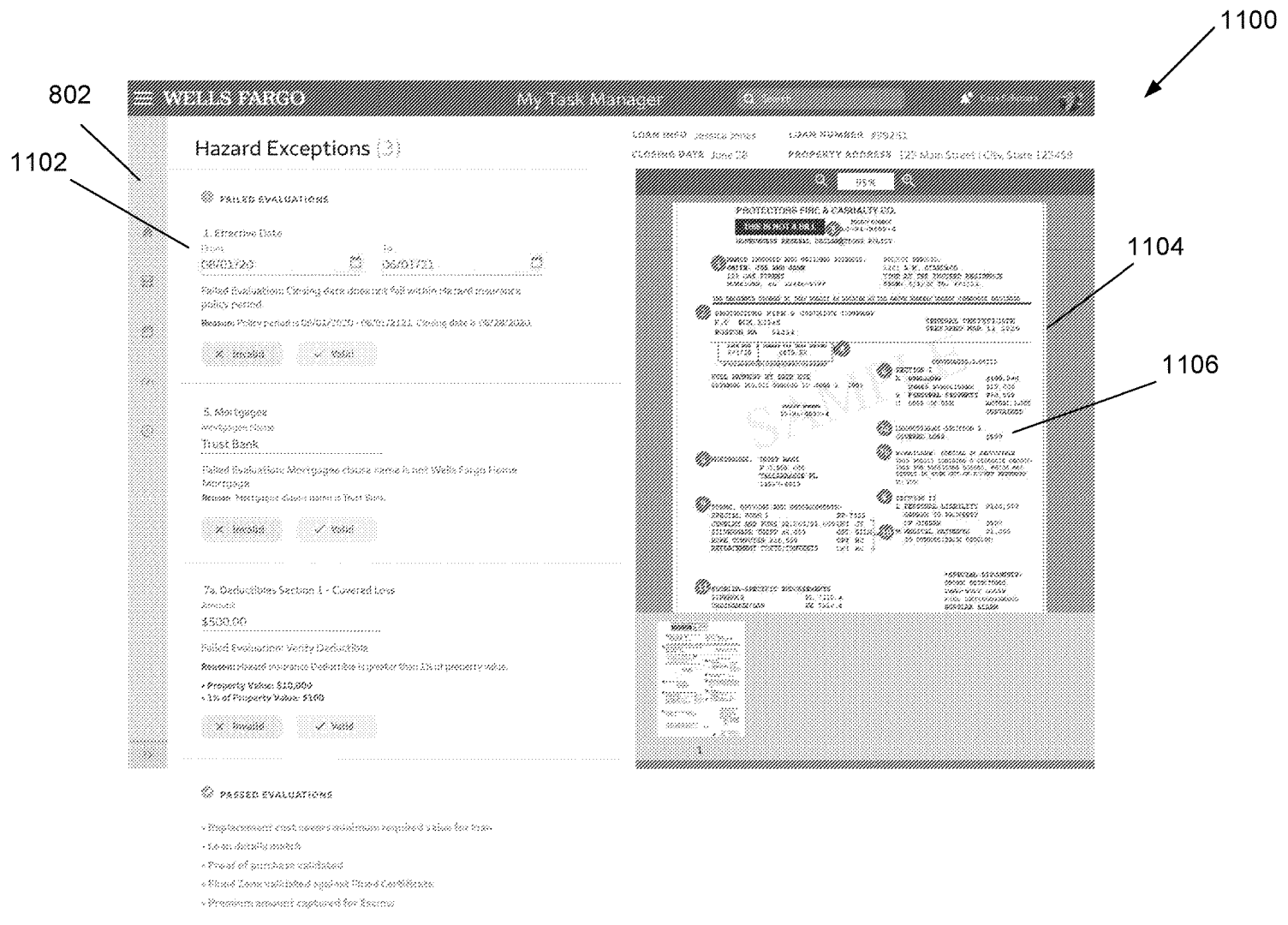
Figure 12:
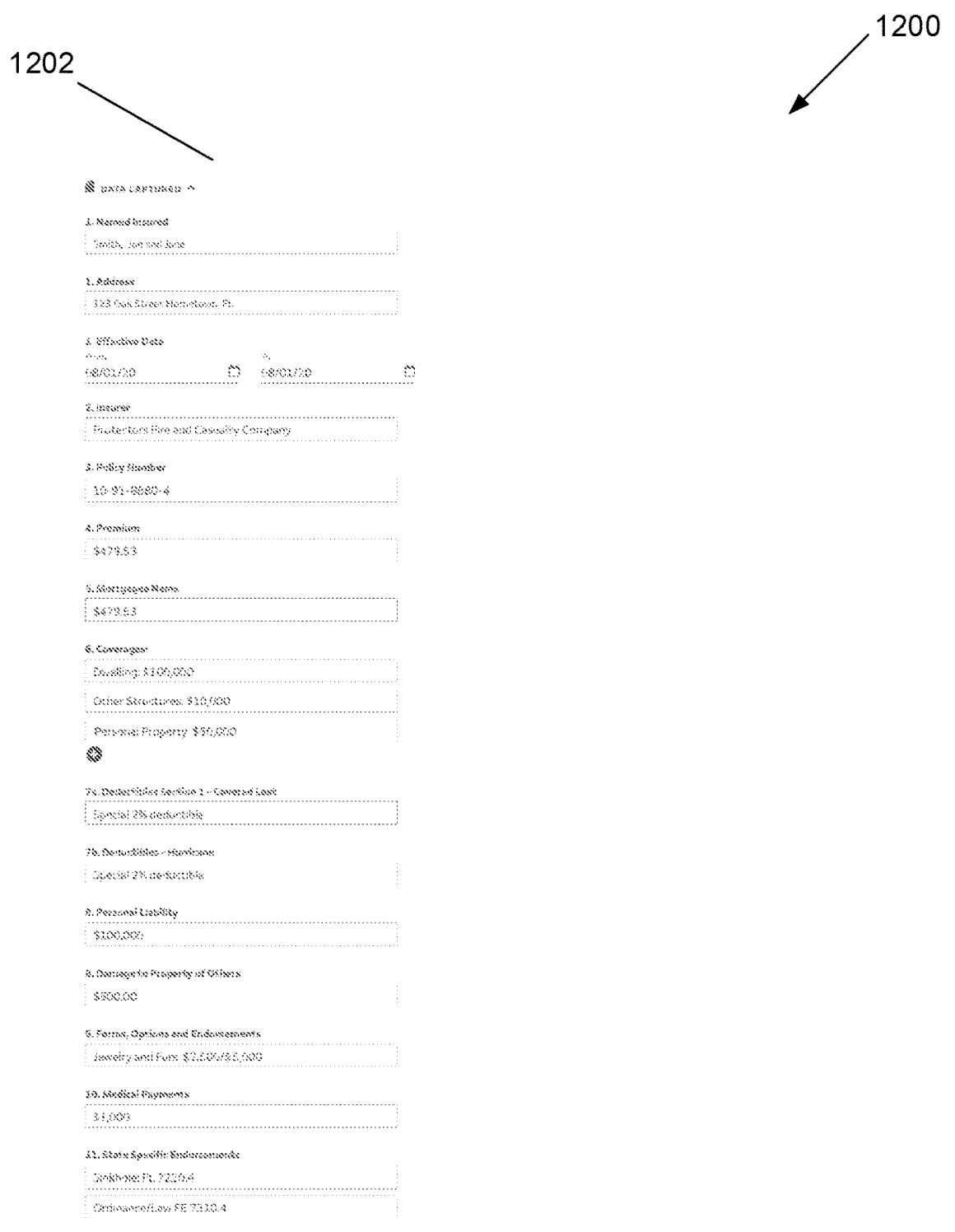

The interface 800 includes a menu bar 802 that facilitates selection among various interfaces. These interfaces include, without limitation, an overview interface (FIGS. 8-9) and a documents interface (FIGS. 10-12). Other interfaces, such as dashboard, calendars, documentational views, task due date views, etc. can also be provided.

The interface 800 also includes a loan information pane 804 that provides a pictorial representation of the status of the transaction. In this instance, the credit profile for the borrower is shown, including credit, income, assets, etc. The pane 804 includes example circle and line bars to illustrate the relative completeness of each depicted item associated with the customer's credit profile.

For instance, a circle is three-quarters filled with green to quantify a percentage of completion of the decision for the specific loan transaction. For instance, the example indicates a decision on the potential or active transaction for the customer is 75 percent complete based upon the current information for the customer. As the information about the assets and other conditions change over time, the quantification can increase or decrease, with a 100 percent qualification profile indicating that the customer is approved for the loan transaction. It is appreciated that pane 804 is customized specifically to the customer, and the information shown and presented will dynamically change based on the particular customer.

The interface 800 further includes a pane 806 that lists general bibliographic information associated with the transaction, such as relevant dates (application and closing), loan completion status, and specifics on the loan (e.g., number, agency, purpose, etc.).

An action pane 808 of the interface 800 includes descriptions of next actions in the transaction process. Each listed action includes a description of the action, a due date, and a control that is selectable to initiate the action. For instance, one of the actions is to perform a credit report assessment by Jun. 18, 2000. The action can be initiated by receipt of selection of the "Start" button associated with the action.

A pane 810 of the interface 800 lists actions that have failed. Each failed action includes a description of the action, a reason for the failure, a due date, and controls that are selectable to provide further detail or flag for follow up. For instance, one failed action involves the mismatch of an institution name to the application name for the transaction. The failed actions can be filtered and/or sorted based upon various criteria, such as unflagged actions, flagged actions, due date, etc.

Finally, a pane 812 of the interface 800 lists a timeline of activity associated with the transaction. This timeline includes a date and time for each activity, a description of the activity, and a control that is selectable to provide more details on the activity. For instance, one activity for May 20, 2000 involves a customer service representative sending the customer a letter of explanation. This letter is accessible upon receipt of selection of the associated control.

The interface 800 also includes an alert bar 814 that provides alerts associated with the transaction. The alert bar 814 can provide a description of the alert and a control that is selectable to load more information associated with the alert, such as a relevant interface and/or document. For instance, the example alert shown in the alert bar 814 is a failed evaluation for the appraisal, the failure reason ("As Is"), and a selectable control to view the appraisal.

Figure 9:
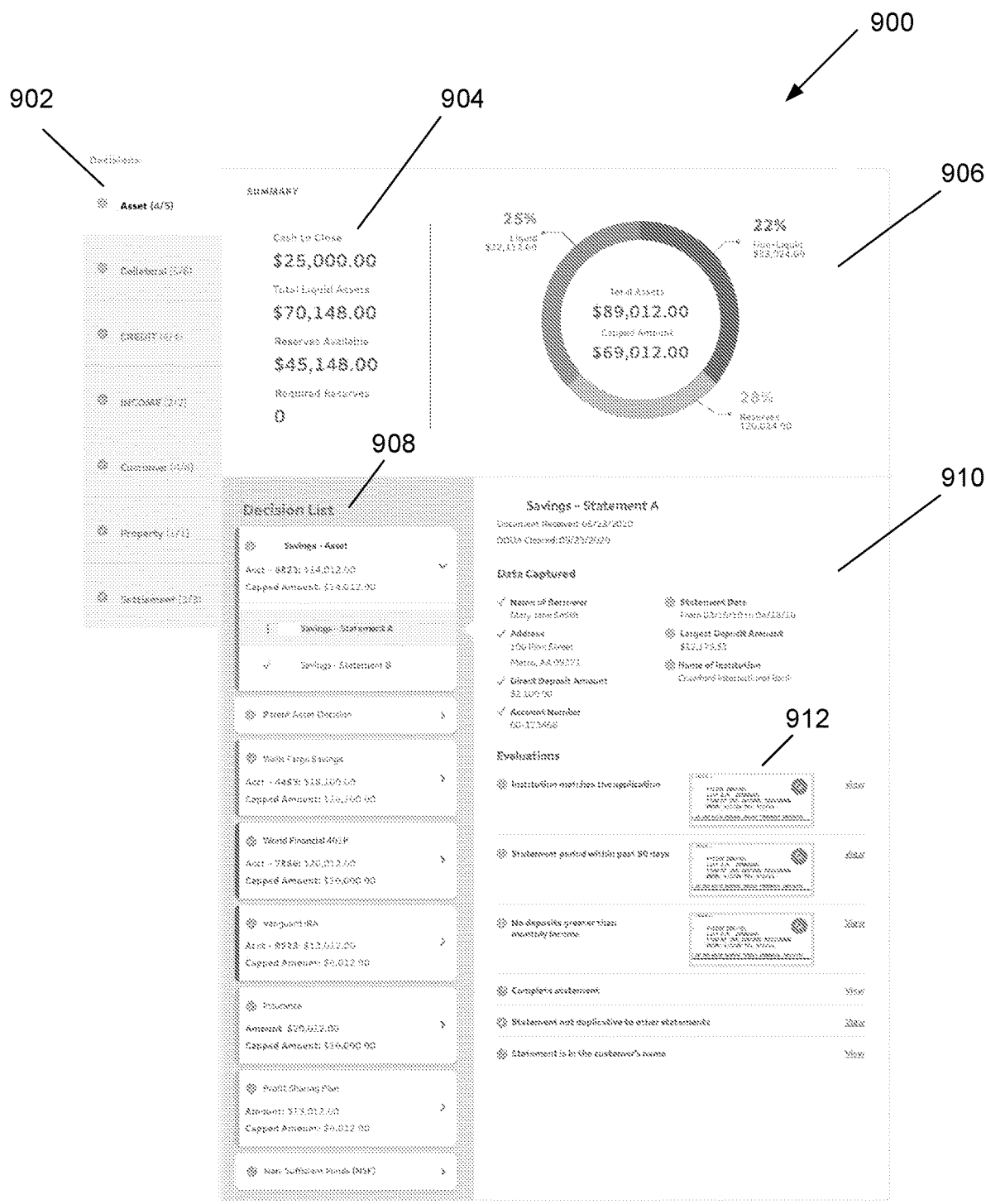
FIG. 9 is another example user interface for the system of FIG. 6.
Figure 10:
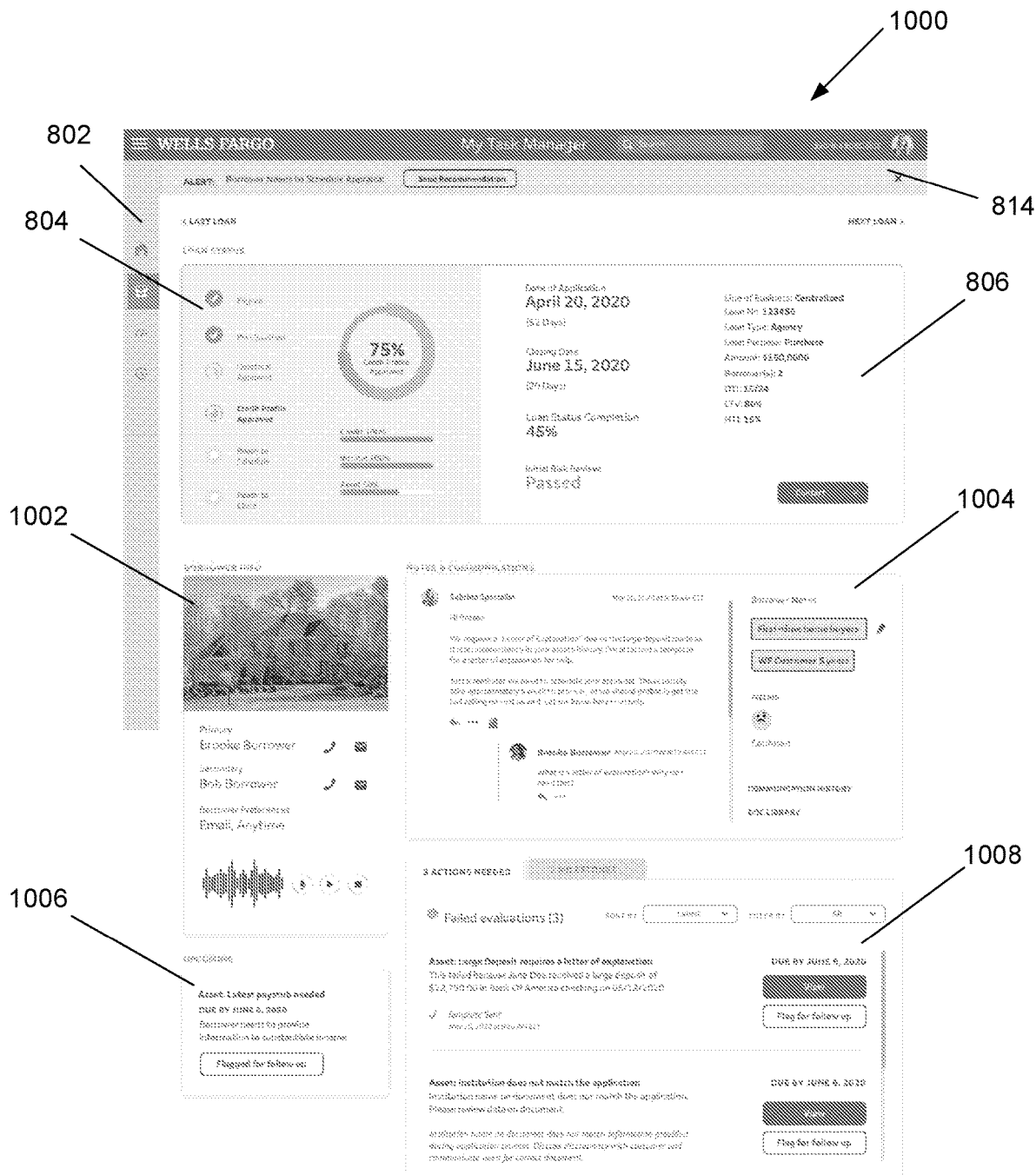
FIG. 10 is another example user interface for the system of FIG. 6.

Referring now to FIG. 9, an interface 900 is shown providing additional details regarding the credit determination for the customer for the transaction. In some examples, the interfaces 800 and 900 can be combined and displayed as a single, scrollable interface.

The interface 900 includes a menu 902 with selectable tabs to transition between different groups of information that are relevant to the credit determination. These include assets, collateral, credit, income, property, and settlement. Each tab also includes a number of the items associated with the tab and a colored icon to indicate a status of those items. For instance, the assets tab includes five assets and has a warning icon in orange color to indicate a problem with one of the assets. This allows the interface 900 to efficiently convey the status of each asset. In this example, the "Asset" tab of the menu 902 is selected, so the interface 900 depicts information associated with the assets for the transaction.

The interface 900 includes a pane 904 including summary asset information, such as cash needed to close the transaction, liquid assets, and reserves. In addition, a pane 906 provides a visual depiction (e.g., circle with colors to depict different asset values) of the asset information from the pane 904.

The interface 900 includes an assets pane 908 listing each asset, including information like asset name, account numbers, and balances. A selected account ("Savings—Statement A") includes details displayed in a statement pane 910. These details include information pulled from a statement associated with the selected account, such as a statement of a savings account. The information includes owner name, address, statement date, and transaction details (largest deposit).

In addition, a pane 912 of the interface 900 lists items pulled from the statement, with each statement item including an item description. Within pane 912 a status icon is colored to indicate whether there is an issue with the item. In particular, the status icon indicates that the item requires manual evaluation by the user (i.e., the customer service representative in this instance). In various examples, status icons may appear for a particular item (e.g., data field within a document) when the system identifies that a particular document, item, or other information fails an evaluation.

For instance, the automation performs evaluations of each item of information taken from the statement. Items are flagged are flagged and highlighted (e.g., for human review) when the contextualizing engine determines that the particular data does not meet a confidence level according to a model. This may occur when the data conflicts with data within the system, when the data fails formatting or other checks (e.g., 123 Main St. is entered for a username), or when the data is difficult to read. Also, some regulatory requirements necessitate human verification of certain data fields. The interface 900 can facilitate that, i.e., to confirm decisions made by the contextualizing engine.

A link that is selectable to view the statement, and an excerpt from the statement with the original item details highlighted for those items with a problem indicated. For instance, the first item indicates an issue associated with the institution name failing to match the name on the application. The item details may be heighted within the statement by color, shade, underlining, etc. An example of interactive user interface for completing an evaluation is described herein with reference to at least FIG. 11.

Referring now to FIG. 10, another example interface 1000 is depicted. This interface 1000 provides information for the customer service representative as the customer service representative communicates with or is otherwise assisting the customer. The interface includes a pane 1002 providing information about the customer, including a picture of the home for purchase and contact names and information.

A pane 1004 of the interface 1000 provides communications and notes, such as recent communications with the customer and notes about the customer, such as the customer being a first-time purchaser and customer of the financial institution for a certain number of years. The pane 1004 also provides information include selectable links for accessing the communication history and relevant documents associated with the transaction, along with a status indicator for how the customer may currently be feeling (e.g., "Confused"). The customer's condition or emotion may be based on sentiment analysis for interactions with the customer, e.g., phone calls, emails, text messages, etc. In at least one example, sentiment analysis may include a combination of natural language processing, text analysis, and/or computation linguistics to quantify and ascertain an emotion state of the customer.

A pane 1006 of the interface 1000 lists upcoming actions, such as the need for submission of a latest paystub. This action includes a due date and description of the action. Finally, a pane 1008 lists evaluations for the transaction that have failed. This includes the type of failure, a description of the failure, and a control that is selectable to view more information, such as the underlying documentation associated with the failure. All of this information allows the customer service representative to better assist the customer through the transaction.

FIG. 11 illustrates an interface 1100 for review of failed evaluations associated with a transaction, such as those listed in the pane 1008 of FIG. 10.

In some examples, the interface 1100 provides for the manual intervention associated with items that are flagged or otherwise fail during the data driven decision automation by the system. The interface 1100 provides for an efficient, streamlined process for manual review and manipulation for these items.

For instance, the interface 1100 allows for a data quality for a transaction to be enhanced. Data can be obtained from various sources with varying levels of quality. Failures or warning associated with the data can be addressed by the user of the interface 1100. These changes can be received individually or in bulk though the interface 110, as described further below. In various examples, a required evaluation may be prompted when the data fails to meet certain rules (e.g., formatting, content, matches contextually with other data, etc.) as defined by the data contextualizing engine. In this example, one instance of this is the effective date for a policy failing to correspond to a closing date, as noted below. In such a circumstance, the contextualizing engine identifies the mismatch during an evaluation and flags the item for further review, either automatic or manual.

More specifically, the interface 1100 allows for the confirmation and correction of data by the customer service representative. That is, the customer service representative may be asked (through the interface 1100) to confirm data that has been extracted from or identified within a data source (e.g., the illustrated document) by the contextualizing engine. The interface 1100 allows for the confirmation and correction of objective data and subjective data. For the subjective data, the review and/or manipulation of the data can be guided by the system to break a subjective determination into smaller, objective steps.

For example, pictures may be required of a home located on a property associated with the transaction. A subjective determination may be needed to determine what the pictures depict. The system guides the customer service representative through more objective determinations to allow for that assessment. For instance, the system can show a picture along with a query asking if the picture depicts a front side of the property. One or more selectable controls are provided to allow for the receipt of a selection by the customer service representative.

Finally, the system can be programmed to proactively address certain exceptions or failures before they are listed on the interface 1100. For instance, if certain data from a third-party source (e.g., a vendor) always exhibits certain failures or warnings, the system can learn to address such issues for that source without manual intervention.

The interface 1100 includes an exceptions pane 1102 listing each of the items from a statement 1106 (i.e., digitally scanned document) that is relevant to the evaluation. For each item, a description is provided, along with a reason for failure and controls that are selectable to confirm the listed information.

For instance, the first failed evaluation involves the effective dates for the insurance policy associated with the transaction. The effective dates are listed, along with an indication that the closing date does not fall within the effective policy dates. The effective dates are highlighted on the underlying policy statement 1106 shown in a statement pane 1104 to allow the customer service representative to confirm whether the dates are correctly listed.

Upon selection of one of the dates shown in the pane 1102, a calendar is provided to allow for receipt of a change in the listed date based upon the information from the statement 1106 depicted in the pane 1104. Controls are also provided. Upon receipt of selection of a button "Invalid" confirms that a failure has occurred, and upon receipt of selection of a button "Valid" indicates that the failure associated with the listed information has been resolved. This allows the customer service representative to efficiently review the captured data and the system to receive manipulation or confirmation from the representative.

The statement 1106 shown in pane 1104 is coded so that each item pulled therefrom is identified. For instance, the policy effective dates are identified by the numeral "1" on the policy statement 1106 and listed with the numeral "1" in the failed evaluations in the pane 1102.

Further, as shown in FIG. 12, an interface 1200 includes a listing 1202 of each item pulled from the policy statement 1106 depicted in the pane 1104, with items being coded appropriately. Some of the items in the listing 1202 are editable by the customer service representative based upon the review of the statement 1106. In some examples, the interfaces 1100 and 1200 can be combined and displayed on a single interface.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A method for managing an electronic loan application, comprising:
listing financial information associated with a loan transaction, the financial information including details of the loan transaction and an indicator of a status of an attribute of the loan transaction;
listing an asset associated with the loan transaction; and
listing an item associated with the asset, with the item including a status indicator and an excerpt from a statement associated with the item.

2. The method of claim 1, further comprising listing upcoming actions associated with the electronic loan application, with the upcoming actions including a description of an action, a due date for the action, and a control for initiating the action.

3. The method of claim 1, further comprising listing evaluations of items associated with the loan transaction, the items each including an evaluation description, a reason for failure, and a control for viewing additional information.

4. The method of claim 3, further comprising a control linking each of the items to the statement.

5. The method of claim 1, further comprising listing a plurality of activities associated with the loan transaction in a chronological order, with the plurality of activities including an activity description, a date, and a control for viewing additional information.

6. The method of claim 1, wherein the status indicator includes a color coded to indicate a positive or negative result.

7. The method of claim 1, further comprising generating a graphical element coded to indicate an inquiry status of an inquiry related to the loan transaction.

8. The method of claim 1, further comprising listing items that have failed evaluation, with each item including data from the statement, a description of an exception associated with the item, and a control actuable to indicate a validity of the item.

9. The method of claim 8, wherein the control includes a valid button and an invalid button indicating the validity of the item upon receipt of selection of one of the valid button and the invalid button.

10. The method of claim 8, further comprising generating a user interface including a passed interface listing further items associated with the statement for the loan transaction that have passed evaluation.

11. A system for managing an electronic loan application, comprising:
one or more processors; and
non-transitory computer-readable storage encoding instructions which, when executed by the one or more processors, cause the system to generate a user interface including:
financial information associated with a loan transaction, the financial information including details of the loan transaction and an indicator of a status of an attribute of the loan transaction; and
an asset associated with the loan transaction; and
an item associated with the asset, with the item including a status indicator and an excerpt from a statement associated with the item.

12. The system of claim 11, comprising further instructions which, when executed by the one or more processors, cause the system to generate the user interface including upcoming actions associated with the electronic loan application, with the upcoming actions including a description of an action, a due date for the action, and a control for initiating the action.

13. The system of claim 11, comprising further instructions which, when executed by the one or more processors, cause the system to generate the user interface including evaluations of items associated with the loan transaction, the items each including an evaluation description, a reason for failure, and a control for viewing additional information.

14. The system of claim 13, comprising further instructions which, when executed by the one or more processors, cause the system to generate the user interface including a control linking each of the items to the statement.

15. The system of claim 11, comprising further instructions which, when executed by the one or more processors, cause the system to generate the user interface including a plurality of activities associated with the loan transaction in a chronological order, with the plurality of activities including an activity description, a date, and a control for viewing additional information.

16. The system of claim 11, wherein the status indicator includes a color coded to indicate a positive or negative result.

17. The system of claim 11, comprising further instructions which, when executed by the one or more processors, cause the system to generate the user interface including a graphical element coded to indicate an inquiry status of an inquiry related to the loan transaction.

18. The system of claim 11, comprising further instructions which, when executed by the one or more processors, cause the system to generate the user interface including a listing of items that have failed evaluation, with each item including data from the statement, a description of an exception associated with the item, and a control actuable to indicate a validity of the item.

19. The system of claim 18, wherein the control includes a valid button and an invalid button indicating the validity of the item upon receipt of selection of one of the valid button and the invalid button.

20. The system of claim 18, comprising further instructions which, when executed by the one or more processors, cause the system to generate the user interface including items associated with the statement for the loan transaction that have passed evaluation.

* * * * *